United States Patent [19]
Takahashi et al.

[11] Patent Number: 6,141,168
[45] Date of Patent: *Oct. 31, 2000

[54] AUTOMATIC CALIBRATION METHOD, READ APPARATUS AND STORAGE APPARATUS

[75] Inventors: Tsuyoshi Takahashi; Toshiki Kimura, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/568,860

[22] Filed: Dec. 5, 1995

[30] Foreign Application Priority Data

Apr. 21, 1995 [JP] Japan ................................ 7-096820

[51] Int. Cl.⁷ .................................. G11B 5/09; G11B 5/03
[52] U.S. Cl. ................................. 360/66; 360/46
[58] Field of Search .................... 360/46, 65, 66

[56] References Cited

U.S. PATENT DOCUMENTS

| | | | |
|---|---|---|---|
| 4,528,602 | 7/1985 | Crick et al. | 360/66 |
| 4,611,253 | 9/1986 | Kamei et al. | 360/66 |
| 5,084,791 | 1/1992 | Thanos et al. | 360/77.08 |
| 5,185,681 | 2/1993 | Volz et al. | 360/77.05 |
| 5,301,080 | 4/1994 | Ottesen et al. | 360/66 |
| 5,319,502 | 6/1994 | Feig | 360/46 |
| 5,341,249 | 8/1994 | Abbott et al. | 360/46 |
| 5,416,646 | 5/1995 | Shirai | 360/46 |
| 5,563,746 | 10/1996 | Bliss | 360/65 |
| 5,751,185 | 5/1998 | Yamamoto et al. | 327/558 |

FOREIGN PATENT DOCUMENTS

| | | |
|---|---|---|
| 1-211279 | 8/1989 | Japan . |
| 594608 | 4/1993 | Japan . |
| 5135509 | 6/1993 | Japan . |
| 5242617 | 9/1993 | Japan . |
| 6187738 | 7/1994 | Japan . |
| 6231410 | 8/1994 | Japan . |

Primary Examiner—Paul Loomis
Assistant Examiner—Regina Y. Neal
Attorney, Agent, or Firm—Greer, Burns & Crain, Ltd.

[57] ABSTRACT

An automatic calibration method for a read system in which data read by a head from a recording medium is demodulated using a partial response method which includes the steps of: storing at least one of a parameter relating to a bias current fed to the head and parameters necessary for data demodulation in the read system, for a plurality of operating conditions; and automatically calibrating the at least one parameter to a preset value suitable for an operating condition.

23 Claims, 21 Drawing Sheets

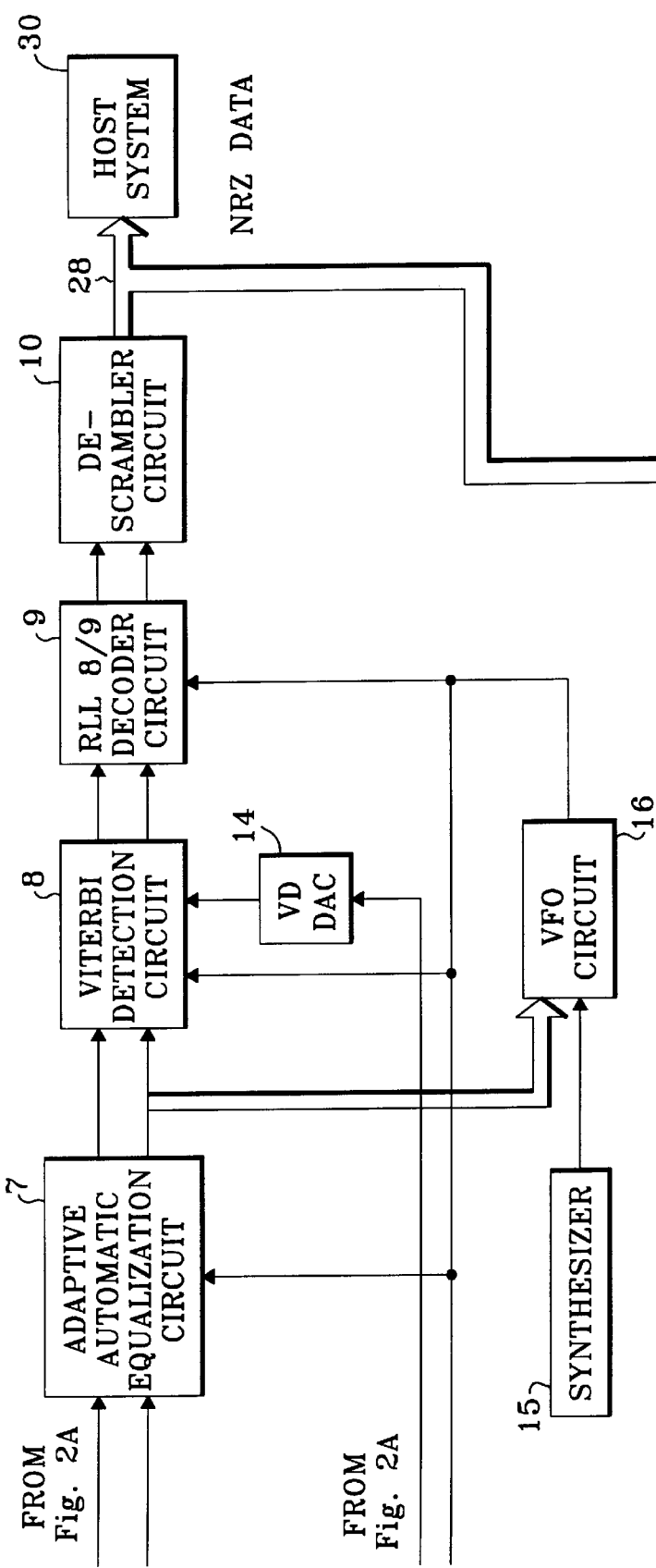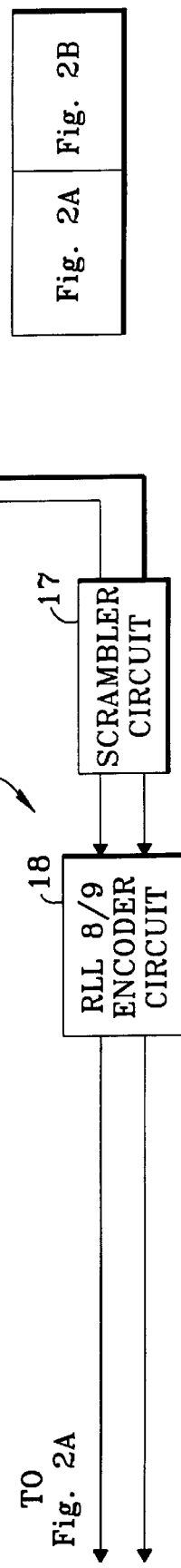

Fig. 3

| SET VALUES FED TO DAC | SENSE CURRENT FOR MR HEAD |
|---|---|
| FF | $Is_{ff}$ |
| FE | $Is_{fe}$ |
| FD | $Is_{fd}$ |
| . | . |
| . | . |
| . | . |
| . | . |
| . | . |
| 80 | $Is_{80}$ |
| 7F | $Is_{7f}$ |
| . | . |
| . | . |
| . | . |
| 02 | $Is_{02}$ |
| 01 | $Is_{01}$ |
| 00 | $Is_{00}$ |

Fig. 4

| SENSE CURRENT \ HEAD | 0 | 1 | 2 | 3 | ... | n-1 | n |
|---|---|---|---|---|---|---|---|
| $I_{S00}$ | $I_{000}$ | $I_{100}$ | $I_{200}$ | $I_{300}$ | ... | $I_{n-100}$ | $I_{n00}$ |
| $I_{S01}$ | $I_{001}$ | $I_{101}$ | $I_{201}$ | $I_{301}$ | ... | $I_{n-101}$ | $I_{n01}$ |
| ... | ... | ... | ... | ... | ... | ... | ... |
| $I_{S80}$ | $I_{080}$ | $I_{180}$ | $I_{280}$ | $I_{380}$ | ... | $I_{n-180}$ | $I_{n80}$ |
| $I_{S81}$ | $I_{081}$ | $I_{181}$ | $I_{281}$ | $I_{381}$ | ... | $I_{n-181}$ | $I_{n81}$ |
| $I_{S82}$ | $I_{082}$ | $I_{182}$ | $I_{282}$ | $I_{382}$ | ... | $I_{n-182}$ | $I_{n82}$ |
| $I_{S83}$ | $I_{083}$ | $I_{183}$ | $I_{283}$ | $I_{383}$ | ... | $I_{n-183}$ | $I_{n83}$ |
| ... | ... | ... | ... | ... | ... | ... | ... |
| $I_{SFE}$ | $I_{0FE}$ | $I_{1FE}$ | $I_{2FE}$ | $I_{3FE}$ | ... | $I_{n-1FE}$ | $I_{nFE}$ |
| $I_{SFF}$ | $I_{0FF}$ | $I_{1FF}$ | $I_{2FF}$ | $I_{3FF}$ | ... | $I_{n-1FF}$ | $I_{nFF}$ |

Fig. 8

| NORMALIZED LINEAR DENSITY $K=\dfrac{W50}{T}$ | CYLINDER ZONE | | | | | | | | | |
|---|---|---|---|---|---|---|---|---|---|---|
| | ZONE 1 | ZONE 2 | ZONE 3 | ZONE 4 | ... | ZONE n | | | | |
| a | $Fc_a^1\ Fb_a^1$ | $Fc_a^2\ Fb_a^2$ | $Fc_a^3\ Fb_a^3$ | $Fc_a^4\ Fb_a^4$ | ... | $Fc_a^n\ Fb_a^n$ |
| b | $Fc_b^1\ Fb_b^1$ | $Fc_b^2\ Fb_b^2$ | $Fc_b^3\ Fb_b^3$ | $Fc_b^4\ Fb_b^4$ | ... | $Fc_b^n\ Fb_b^n$ |
| c | $Fc_c^1\ Fb_c^1$ | $Fc_c^2\ Fb_c^2$ | $Fc_c^3\ Fb_c^3$ | $Fc_c^4\ Fb_c^4$ | ... | $Fc_c^n\ Fb_c^n$ |
| ... | ... | ... | ... | ... | ... | ... |
| l | $Fc_l^1\ Fb_l^1$ | $Fc_l^2\ Fb_l^2$ | $Fc_l^3\ Fb_l^3$ | $Fc_l^4\ Fb_l^4$ | ... | $Fc_l^n\ Fb_l^n$ |
| m | $Fc_m^1\ Fb_m^1$ | $Fc_m^2\ Fb_m^2$ | $Fc_m^3\ Fb_m^3$ | $Fc_m^4\ Fb_m^4$ | ... | $Fc_m^n\ Fb_m^n$ |
| n | $Fc_n^1\ Fb_n^1$ | $Fc_n^2\ Fb_n^2$ | $Fc_n^3\ Fb_n^3$ | $Fc_n^4\ Fb_n^4$ | ... | $Fc_n^n\ Fb_n^n$ |
| ... | ... | ... | ... | ... | ... | ... |
| y | $Fc_y^1\ Fb_y^1$ | $Fc_y^2\ Fb_y^2$ | $Fc_y^3\ Fb_y^3$ | $Fc_y^4\ Fb_y^4$ | ... | $Fc_y^n\ Fb_y^n$ |
| z | $Fc_z^1\ Fb_z^1$ | $Fc_z^2\ Fb_z^2$ | $Fc_z^3\ Fb_z^3$ | $Fc_z^4\ Fb_z^4$ | ... | $Fc_z^n\ Fb_z^n$ |

Fig. 9

| CYLINDER ZONE / HEAD | ZONE 1 | ZONE 2 | ZONE 3 | ... | ZONE n |
|---|---|---|---|---|---|
| 0 | $Fc^{01}/Fb^{01}$ | $Fc^{02}/Fb^{02}$ | $Fc^{03}/Fb^{03}$ | ... | $Fc^{0n}/Fb^{0n}$ |
| 1 | $Fc^{11}/Fb^{11}$ | $Fc^{12}/Fb^{12}$ | $Fc^{13}/Fb^{13}$ | ... | $Fc^{1n}/Fb^{1n}$ |
| 2 | $Fc^{21}/Fb^{21}$ | $Fc^{22}/Fb^{22}$ | $Fc^{23}/Fb^{23}$ | ... | $Fc^{2n}/Fb^{2n}$ |
| 3 | $Fc^{31}/Fb^{31}$ | $Fc^{32}/Fb^{32}$ | $Fc^{33}/Fb^{33}$ | ... | $Fc^{3n}/Fb^{3n}$ |
| 4 | $Fc^{41}/Fb^{41}$ | $Fc^{42}/Fb^{42}$ | $Fc^{43}/Fb^{43}$ | ... | $Fc^{4n}/Fb^{4n}$ |
| 5 | $Fc^{51}/Fb^{51}$ | $Fc^{52}/Fb^{52}$ | $Fc^{53}/Fb^{53}$ | ... | $Fc^{5n}/Fb^{5n}$ |
| 6 | $Fc^{61}/Fb^{61}$ | $Fc^{62}/Fb^{62}$ | $Fc^{63}/Fb^{63}$ | ... | $Fc^{6n}/Fb^{6n}$ |
| 7 | $Fc^{71}/Fb^{71}$ | $Fc^{72}/Fb^{72}$ | $Fc^{73}/Fb^{73}$ | ... | $Fc^{7n}/Fb^{7n}$ |
| 8 | $Fc^{81}/Fb^{81}$ | $Fc^{82}/Fb^{82}$ | $Fc^{83}/Fb^{83}$ | ... | $Fc^{8n}/Fb^{8n}$ |
| ... | ... | ... | ... | ... | ... |
| m | $Fc^{m1}/Fb^{m1}$ | $Fc^{m2}/Fb^{m2}$ | $Fc^{m3}/Fb^{m3}$ | ... | $Fc^{mn}/Fb^{mn}$ |

Figures 10A, 10B, 10C, 10D, 10E, 10F, 10G:
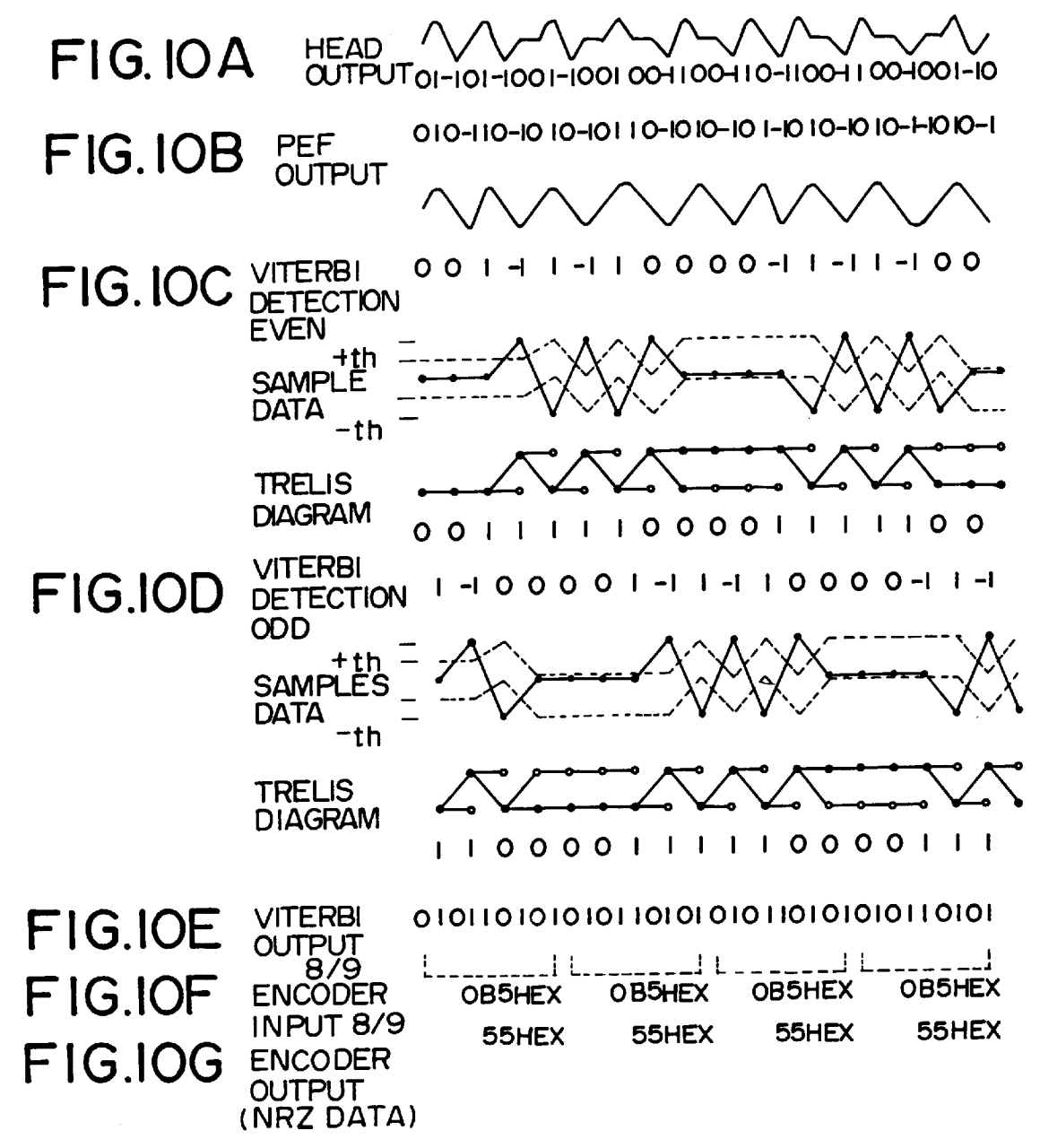

FIG.10A HEAD OUTPUT
01-101-1001-1001 00-1100-110-1100-1 00-1001-10

FIG.10B PEF OUTPUT
010-110-10 10-101 10-1010-10 1-10 10-10 10-1-10 10-1

FIG.10C VITERBI DETECTION EVEN
0 0 1 -1 1 -1 1 0 0 0 0 -1 1 -1 1 -1 0 0
+th SAMPLE DATA -th
TRELIS DIAGRAM
0 0 1 1 1 1 1 0 0 0 0 1 1 1 1 0 0

FIG.10D VITERBI DETECTION ODD
1 -1 0 0 0 0 1 -1 1 -1 1 0 0 0 0 -1 1 -1
+th SAMPLES DATA -th
TRELIS DIAGRAM
1 1 0 0 0 0 1 1 1 1 1 0 0 0 0 1 1 1

FIG.10E VITERBI OUTPUT 8/9
0101101010101 10101 010 110101010110101

FIG.10F ENCODER INPUT 8/9
0B5HEX  0B5HEX  0B5HEX  0B5HEX
55HEX   55HEX   55HEX   55HEX

FIG.10G ENCODER OUTPUT (NRZ DATA)

FIG. 11

| SET VALUE PROVIDED BY DAC | VITERBI SLICE LEVEL (%) |
|---|---|
| F F | 1 0 0 |
| F E | 9 9. 6 |
| F D | 9 9. 2 |
| . | . |
| . | . |
| . | . |
| . | . |
| 8 0 | 5 0. 2 |
| 7 F | 4 9. 8 |
| . | . |
| . | . |
| . | . |
| . | . |
| 0 0 | 0 |

Fig. 12

| SET VALUE REGISTERED IN WCP REGISTER | WRITE PRECOMP. LEVEL (nsec) |
|---|---|
| F | n |
| . | . |
| . | . |
| . | . |
| A | m+2 |
| 9 | m+1 |
| 8 | m |
| . | . |
| . | . |
| . | . |
| 0 | 0 |

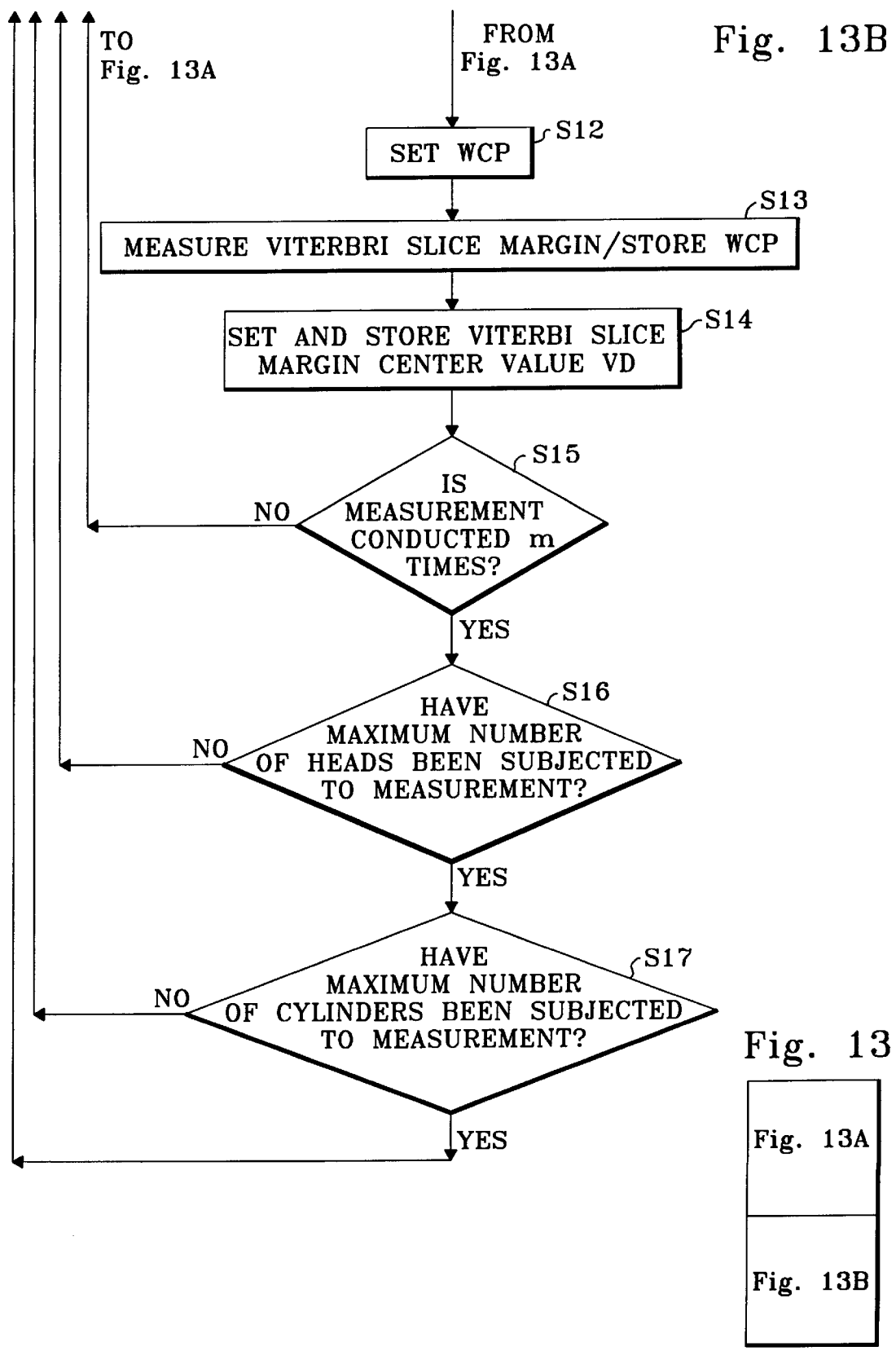

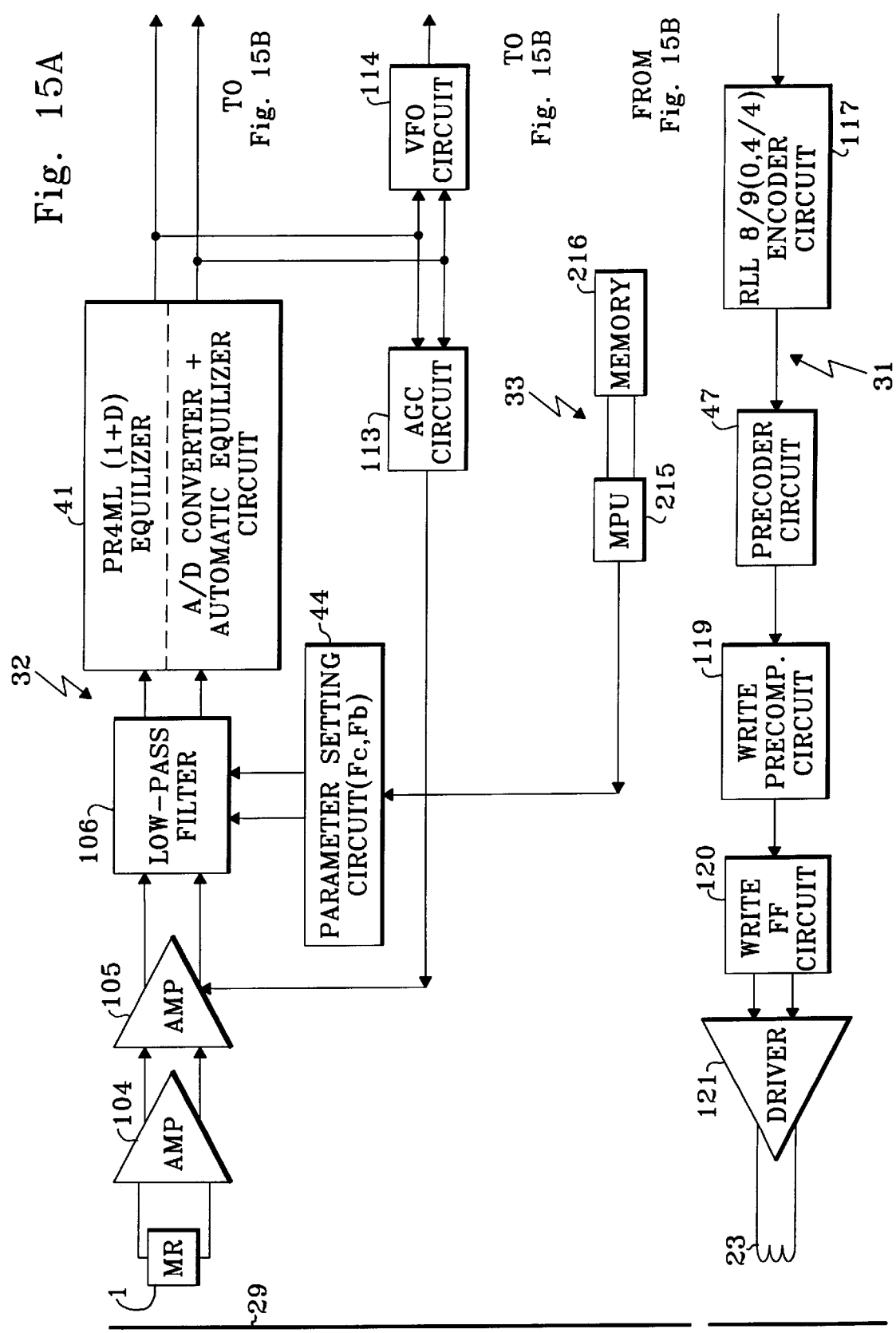

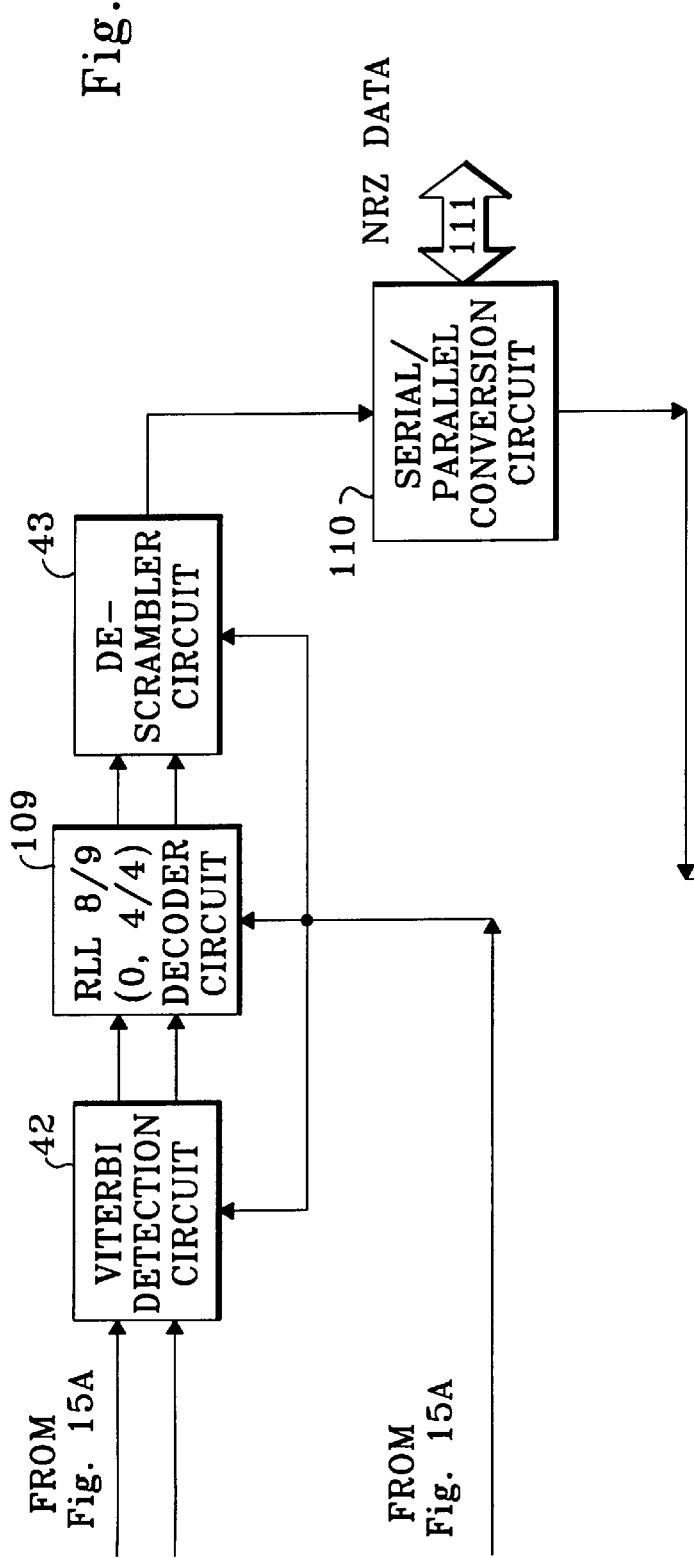
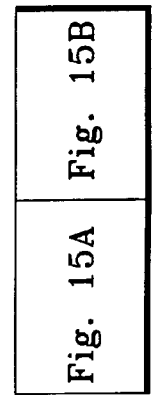
Fig. 15B
Fig. 15

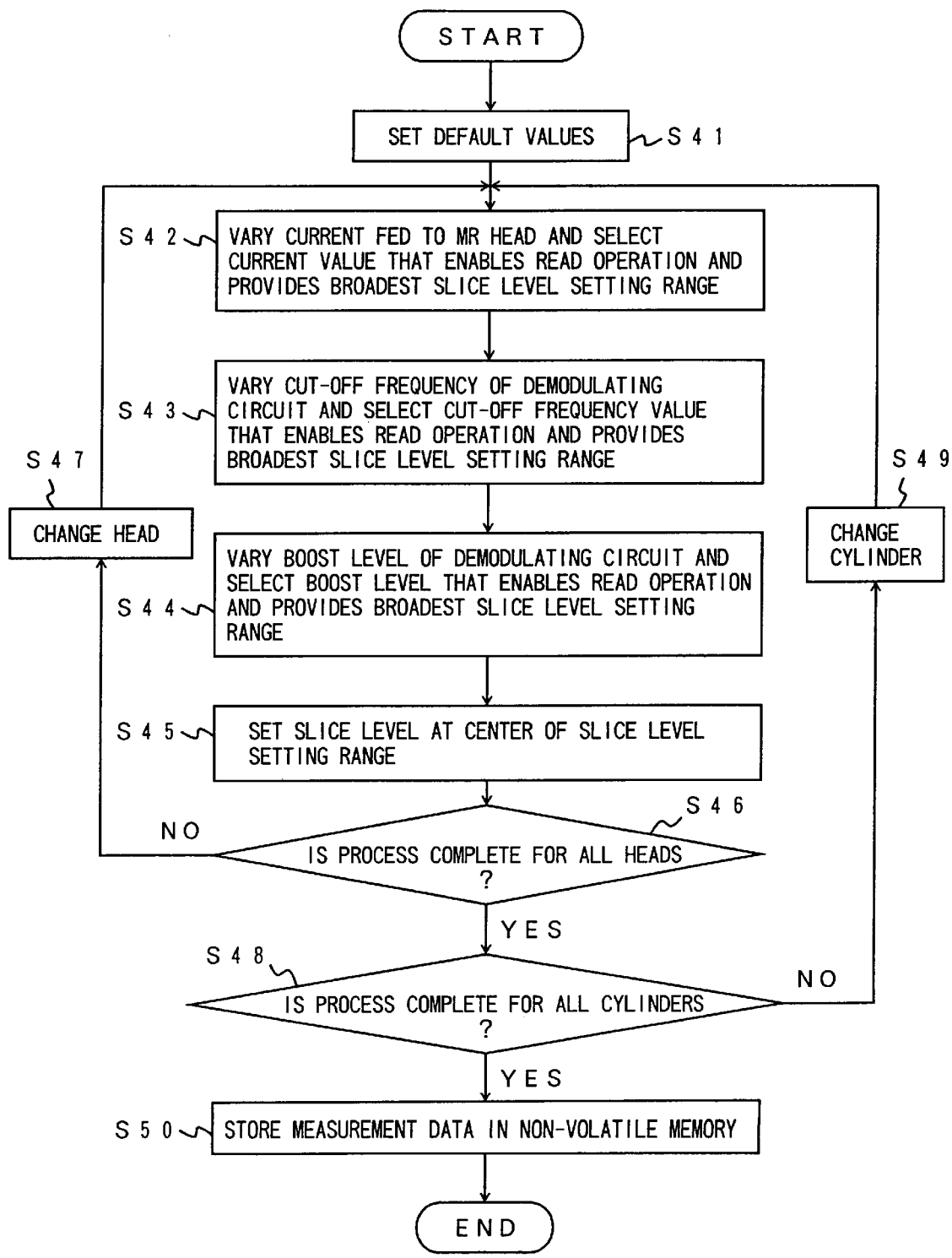

AUTOMATIC CALIBRATION METHOD, READ APPARATUS AND STORAGE APPARATUS

BACKGROUND OF THE INVENTION

1. Field of the Invention

The present invention relates to automatic calibration methods, read apparatuses and storage apparatuses, and more particularly to an automatic calibration method and a read apparatus adapted for a magnetic disk drive using a magneto-resistive (MR) head and characterized by a variation in the environment in which a reading operation takes place, and a storage apparatus using a demodulating system in such a read apparatus.

Recently, the speed of computer operation has become increasingly high and the size of a computer unit has become increasingly small. A direction for high-speed and size reduction is also required for a magnetic disk drive which is used as an external storage unit. In order to realize high-speed and size reduction of a magnetic disk drive, it is necessary to conduct a high-density recording on a magnetic disk. Hence, a high density of data bits results.

In a data demodulating method using a peak detection, a point of variation in data is detected by differentiating a peak point in a waveform of restored data so as to detect a zero crossing point. For this reason, a large peak shift is invited in the conventional data demodulating method when the density of data bits becomes high, due to interwaveform interference (intersymbol interference). A large peak detection error is thus created. As a result, the error rate of the magnetic disk drive increases and the reliability suffers.

For the reason stated above, there is a limit to the effort of improving the reliability of the magnetic disk drive if the conventional data demodulating method is employed in high-density recording. One approach for resolving this situation is a data demodulating method wherein a partial response method called a PR4ML (partial response class 4 maximum likelihood) method is employed. In the PR4ML method, interwaveform interference is assumed as a precondition and taken advantage of.

2. Description of the Related Art

In a demodulating system within a read/write circuit of a conventional magnetic disk drive, parameters of various circuits constituting the demodulating system are predetermined. Specifically, parameters of various circuits in the demodulating system are calibrated under a certain condition (for example, under a normal-temperature condition) and stored in a memory as default values for each cylinder zone. Each time a switching between cylinder zones takes place, default values for the target cylinder zone are read from the memory and set in the circuits in the demodulating system. Thereby, a variation in the characteristic of the demodulating system due to the switching between cylinder zones is canceled.

Generally, the conventional magnetic disk drive uses an inductance head and uses a peak detection method as a data demodulating method. In the demodulating system, the level of equalization by a cosine equalizer is fixed for each cylinder zone. A variation in the characteristic of the demodulating system due to a variation in the characteristic of a head or due to a variation in the temperature is canceled by a margin (read margin) provided by a read characteristic of the demodulating system.

FIG. 1 is a block diagram showing an example of the conventional magnetic disk drive using the peak detection method. Referring to FIG. 1, NRZ (non-return-to-zero) data transferred from a host system (not shown) via an interface 111 is converted into serial data by a serial/parallel conversion circuit 110 and encoded by a RLL (run length limited) encoder circuit 117. The encoded data is fed to a write precompensation (hereinafter, referred to as write precomp.) circuit 119 for setting the level of write precompensation and fed to a write flip-flop (FF) 120. An output of the write FF is applied to a head 101 via a driver 121 and written on a magnetic disk 102.

The data written on the magnetic disk 102 is read by the head 101 and fed to a low-pass filter 106 via a fixed gain amplifier 104 and a variable gain amplifier 105. A gain of the variable gain amplifier 105 is automatically set by an automatic gain control (AGC) circuit 113 based on an output from the low-pass filter 106. A memory 116 stores parameters of a cosine equalizer circuit 107. A microprocessor unit (MPU) 115 sets parameters stored in the memory 116 in the cosine equalizer circuit 107. Consequently, a restored waveform output by the low-pass filter 106 is fed to a differential zero crossing detection circuit 108 after being subjected to equalization by the cosine equalizer circuit 107.

The differential zero crossing detection circuit 108 detects a point of variation in data by differentiating a peak point of the restored data waveform so as to detect a zero crossing point. An output of the differential zero crossing detection circuit 108 is fed to an RLL decoder circuit 109 via a VFO (variable frequency oscillator) circuit 114. The RLL decoder circuit 109 decodes an output of the VFO circuit 114. The decoded data is converted into parallel data (NRZ data) by the serial/parallel conversion circuit 110 and transferred to the host system via the interface 111.

However, if the parameters of the various circuits in the demodulating system are fixed for each cylinder in the high-density recording on the magnetic disk, the effect caused by a variation in the characteristic of a head or a variation in the temperature cannot be canceled by a margin of the read characteristic of the demodulating system. As a result, the error rate of the magnetic disk drive increases and the reliability suffers.

It is particularly to be noted that an MR head produces a relatively large variation in the characteristic of the demodulating system in response to a variation in the environment (for example, the temperature) in which the MR head is used. Hence, if the parameters of the various circuits in the demodulating system employing the PR4ML method are fixed for each cylinder, the effect caused by the variation in the characteristic cannot be canceled by a margin of the read characteristic of the demodulating system. As a result, the error rate of the magnetic disk drive increases and the reliability suffers.

SUMMARY OF THE INVENTION

Accordingly, an object of the present invention is to provide an automatic calibration method, a read apparatus and a storage apparatus wherein the aforementioned problems are eliminated.

Another and more specific object of the present invention is to provide a calibration method, a read apparatus and a storage apparatus, wherein the parameters of the various circuits in a read system are automatically calibrated in accordance with a variation in the environment for a head so that the error rate of a magnetic disk drive is prevented from increasing and the reliability is improved.

The aforementioned objectives can be achieved by an automatic calibration method for a read system in which data read by a head from a recording medium is demodulated using a partial response method, the automatic calibration method comprising the steps of:

a) storing at least one parameter relating to a bias current fed to the head and parameters for data demodulation in the read system, for a plurality of operating conditions; and b) automatically calibrating the at least one parameter to a preset value for an operating condition.

The aforementioned objectives can also be achieved by a read apparatus in which data read by a head from a recording medium is demodulated using a partial response method, the read apparatus comprising:

a demodulating system provided with an equalizer circuit for demodulating data and a maximum likelihood detection circuit;

storing means storing at least one parameter relating to a bias current fed to the head and parameters for data demodulation in the read system, for a plurality of operating conditions; and control means reading parameters from the storing means under an operating condition and automatically calibrating the at least one parameter to a preset value for the operating condition.

The aforementioned objects can also be achieved by a storage apparatus comprising:

a head reading data from a disk;

a demodulating system provided with an equalizer circuit for demodulating data read by the head and a maximum likelihood detection circuit;

storing means storing at least one parameter relating to a bias current fed to the head and parameters for data demodulation in the read system, for a plurality of operating conditions; and control means reading parameters from the storing means under an operating condition and automatically calibrating the at least one parameter to a preset value for the operating condition.

It will be appreciated that, according to the present invention, the parameters of the circuits in the read system can be automatically calibrated in accordance with a variation in the condition for the head, so that the read margin of the magnetic disk drive is improved, the read error rate is prevented from increasing, and the reliability is improved.

According to one aspect of the present invention, the parameters are automatically calibrated at predetermined intervals so as to adapt for a time-dependent variation of the head or the recording medium. Thus, it is always possible to execute a demodulating operation using most suitable parameters.

According to another aspect of the present invention, the filter cut-off frequency and the filter boost level of the PR4 equalizer circuit, and the slice level of the maximum likelihood detection circuit can be automatically calibrated to a most suitable value in accordance with the operating condition.

According to still another aspect of the present invention, it is possible to cancel a variation in the characteristic of heads and improve the reliability of the magnetic disk drive.

The present invention also makes it possible to preset parameters suitable for different operating conditions.

According to yet another aspect of the present invention, the S/N ratio is prevented from dropping when information is read from an ID part in a update write operation so that the read error rate is prevented from increasing. Read error rate in an offset operation performed in a retry operation in response to a read error can also be improved by setting the parameters to the most suitable values.

The present invention also makes it possible to set the parameters to values suitable for different operating conditions.

By providing a cylinder for automatic calibration, it is possible to calibrate parameters in accordance with the recording density in each zone so that a proper calibration suitable for the condition of the head can be carried out for each zone. Since it is possible to calibrate parameters without using a cylinder already used in a write operation, the likelihood of an erroneous write operation can be reduced. Additionally, time required for the calibration can be reduced because a time for accessing other cylinders is not necessary.

By providing a write precompensation circuit, it is possible to prevent the read margin from decreasing due to deterioration in the linear characteristic, even if the frequency characteristic of the head, that is, the linear characteristic varies due to a variation in the operating condition. This can be achieved by automatically calibrating the write precompensation level to an appropriate value.

Therefore, according to the present invention, it is possible to automatically calibrate parameters of the circuits in a read system in accordance with a variation in the condition for the head so that the read margin of the magnetic disk is improved, the read error rate is prevented from increasing, and the reliability is improved.

BRIEF DESCRIPTION OF THE DRAWINGS

Other objects and further features of the present invention will be apparent from the following detailed description when read in conjunction with the accompanying drawings, in which:

FIG. 3 shows a relationship between uncalibrated set values (digital data) fed from an MPU to a DAC and sense currents Is set in a sense current setting circuit;

FIG. 4 shows a relationship between sense currents Is for each MR head and associated set values to be fed to the DAC;

FIG. 8 shows a relationship between normalized linear density K and combinations of a filter cut-off frequency Fc and a filter boost Fb;

FIG. 9 shows a relationship specifying set values to be actually fed to a DAC depending on variations in the MR head;

FIGS. 10A–10G are time charts showing how NRZ data is produced in a read system based on the output from the MR head;

FIG. 11 shows a relationship between set values provided by a DAC and slice levels of a Viterbi detection circuit;

FIG. 12 shows a relationship between write precomp. levels WCP to be set in a write precomp. circuit and associated set values to be specified in a register;

FIG. 15 is a block diagram showing a second embodiment of a storage apparatus according to the present invention;

FIG. 20 is a flowchart explaining an embodiment of an MPU shown in FIG. 19.

DESCRIPTION OF THE PREFERRED EMBODIMENTS

Figure 2A:
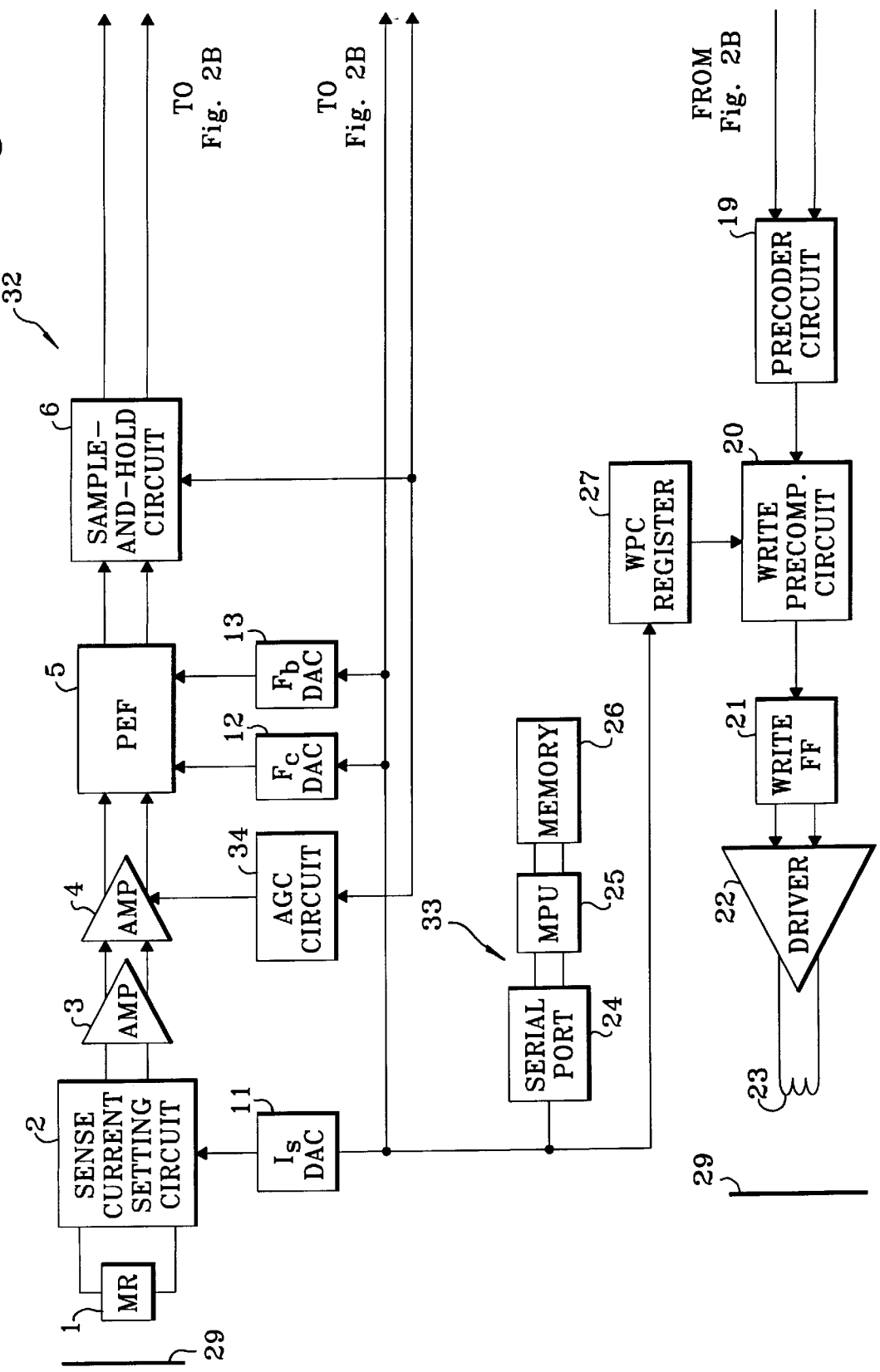
FIG. 2 is a block diagram showing a first embodiment of a storage apparatus according to the present invention.

FIG. 2 is a block diagram showing a first embodiment of the storage apparatus according to the present invention. In the first embodiment of the storage apparatus, a first embodiment of the automatic calibration method according to the present invention and a first embodiment of the read apparatus according to the present invention are used. In the first embodiment of the storage apparatus, the present invention is applied to a magnetic disk drive.

The magnetic disk drive shown in FIG. 2 generally comprises a write system 31, a read system 32 and a control system 33. The write system 31 comprises a scrambler circuit 17, an RLL (8/9) encoder circuit 18, a precoder circuit 19, a write precomp. circuit 20, a write FF 21, a driver 22, a write head 23 and a register 27. The read system 32 comprises an MR head 1, a sense current setting circuit 2, a fixed gain amplifier 3, a variable gain amplifier 4, a programmable electric filter (PEF) 5, a sample-and-hold circuit 6, an adaptive automatic equalizer circuit 7, a Viterbi detection circuit 8, an RLL (8/9) decoder circuit 9, a de-scrambler circuit 10, digital-analog converters (DAC) 11–14, a synthesizer 15, a VFO (variable frequency oscillator) circuit 16 and an AGC circuit 34. The sense current setting circuit 2, the fixed gain amplifier 3, the variable amplifier 4, the PEF 5, the sample-and-hold circuit 6 and the adaptive automatic equalizer circuit 7 constitute a PR4 equalizer circuit. The sample-and-hold circuit 6, the adaptive automatic equalizer circuit 7 and the Viterbi detection circuit 8 constitute a maximum likelihood detection (ML) circuit. The control system 33 comprises a serial port 24, an MPU 25 controlling the operation of the magnetic disk drive as a whole, and a memory 26. For convenience's sake, it is assumed that a magnetic disk 29 shown adjacent to the MR head 1 is the same as the magnetic disk 29 shown adjacent to the write head 23.

A semiconductor chip 32P4910 from SSI Inc. provides certain parts of the systems shown in FIG. 2. More specifically, the semiconductor chip 32P4910 provides the part of the write system 31 including the scrambler circuit 17, the RLL (8/9) encoder circuit 18, the precoder circuit 19, the write precomp. circuit 20 and the write FF 21. The chip 32P4910 also provides the part of the read system 32 including the variable gain amplifier 4, the PEF 5, the sample-and-hold circuit 6, the adaptive automatic equalizer circuit 7, the Viterbi detection circuit 8, the RLL (8/9) decoder circuit 9, the de-scrambler circuit 10, the synthesizer 15, the VFO circuit 16 and the AGC circuit 34. The other parts of the write system 31 and the read system 32 as well as the control system 33 can be provided respectively by a known circuit. Therefore, illustration and description of the internal construction of the individual circuits shown in FIG. 2 are omitted in this specification.

Although FIG. 2 shows one MR head 1 and one write head 23, a pair of the MR head 1 and the write head 23 is provided in an actual disk drive for each one of a plurality of magnetic disks 29. In other words, a set of one write system 31 and one read system 32 is provided for each pair of the MR head 1 and the write head 23.

A description will now be given of an operation for reading data.

The MR head 1 detects a magnetic flux derived from the magnetic disk 29 on which data is written and outputs a restored waveform by converting a variation in magnetic field intensity into a variation in resistivity of the MR head. The sense current setting circuit 2 optimizes an operating point determined by resistivity $\rho$ versus magnetic field intensity H characteristic (hereinafter, referred to as $\rho$-H characteristic) of the MR head 1. The sense current setting circuit 2 sets a sense current Is using an output of the DAC 11 so as to cancel the latitudinal asymmetry of the output waveform and biases the MR head 11 accordingly. More specifically, the MPU 25 reads from the memory 26 data specifying the sense current most suitable for the selected (that is, currently used) MR head 1 under a given operating condition of the magnetic disk drive, and feeds the read data to the DAC 11 via the serial port 24, whereupon the sense current setting circuit 2 sets the sense current Is using the output of the DAC 11.

FIG. 3 shows a relationship between uncalibrated set values fed (digital data) from the MPU 25 to the DAC 11 and the sense currents Is set in the sense current setting circuit 2. FIG. 4 shows a relationship between the sense currents Is for each MR head 1 and the associated set values to be fed to the DAC 11. The memory 26 stores a table specifying the relationship shown in FIG. 3. The MPU 25 determines a sense current Is to be set for the MR head 1 by referring to the table specifying the relationship shown in FIG. 3 and then calibrates the set value in accordance with a variation in the characteristic of the MR head 1 so as to obtain the set value which should be actually fed to the DAC 11. The MPU 25 prepares a table specifying the relationship shown in FIG. 4 accordingly and stores the table in the memory 26. For example, set values entered in meshes in FIG. 4 indicate the calibrated set values. The MPU 25 reads the set value corresponding to the sense current Is for the selected MR head 1 from the table specifying the relationship shown in FIG. 4 and stored in the memory 26. The MPU 25 feeds the read value to the DAC 11. Based on the set value output from the DAC 11, the sense current setting circuit 2 sets the sense current Is most suitable for the selected MR head 1.

Figure 5:
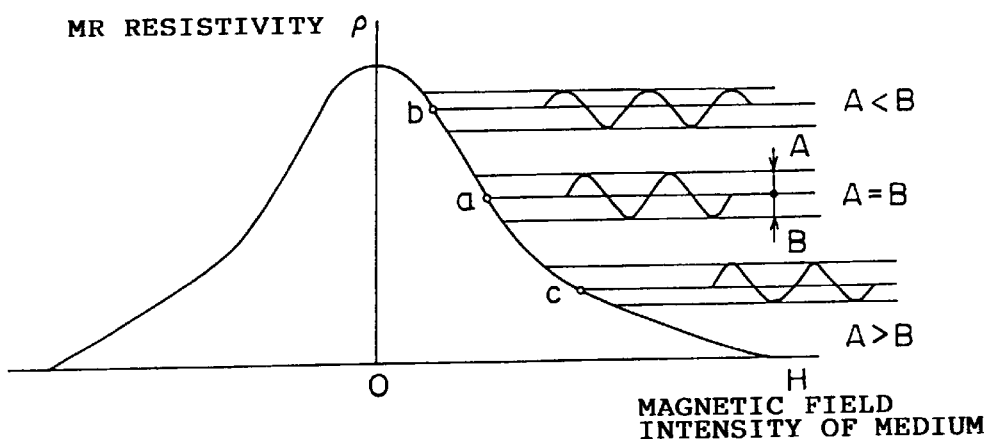
FIG. 5 shows a $\rho$-H characteristic of the MR head 1.

FIG. 5 shows a $\rho$-H characteristic of the MR head 1. Referring to FIG. 5, a latitudinal asymmetry exists at operating points b and c because an upper half of the amplitude A is not equal to a lower half of the amplitude B (A≠B). Consequently, the read error rate may be increased and the read margin may be decreased. Thus, it is required that the sense current Is be calibrated so that the operating point is shifted to a point a, where the symmetry A=B is obtained. In this way, the read margin is improved. Automatic calibration for shifting the operating point to a is effected in this embodiment, by selecting a calibrated value providing a maximum margin in a slice level of the Viterbi detection circuit 8 or a calibrated value providing a maximum track offset enabling a reading operation. In the following description, the read margin having as its parameter a slice level of the Viterbi detection circuit 8 is referred to as a slice margin, and the read margin having as its parameter a track offset is referred to as a track offset margin.

Referring back to FIG. 2, a restored waveform output by the MR head 1 is fed to the fixed gain amplifier 3 via the sense current setting circuit 2 and calibrated into a waveform having a constant level by the variable gain amplifier 4. The waveform output by the variable gain amplifier 4 is fed to the PEF 5 wherein filtering for PR4ML equalizing takes place.

Figure 6:
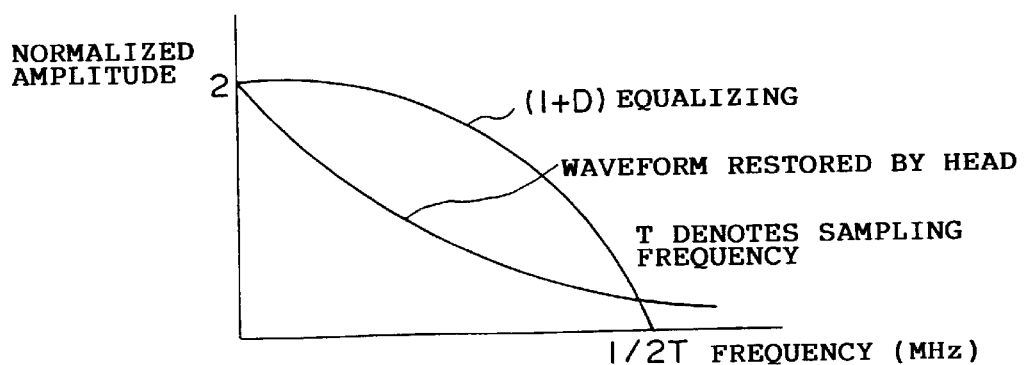
FIG. 6 shows a frequency characteristic of an output from the MR head and a frequency characteristic of PR4ML equalization [(1+D) equalization]
Figure 7:
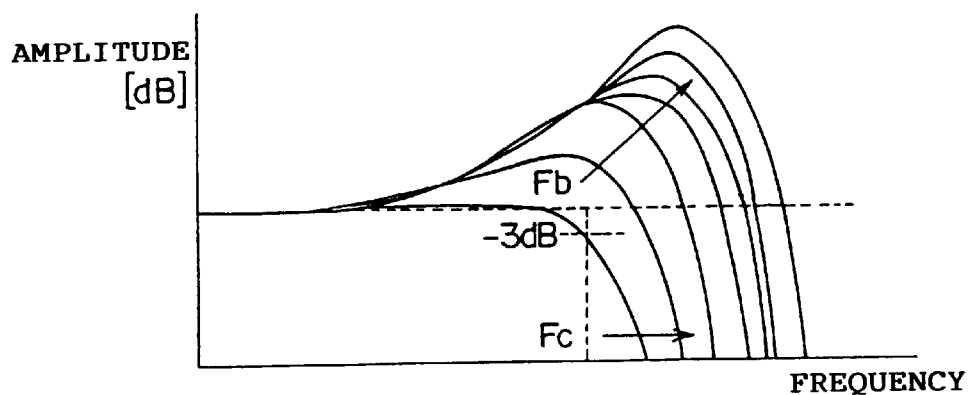
FIG. 7 shows a frequency characteristic of a filter for subjecting the output from the MR head to the PR4ML equalization.

FIG. 6 shows a frequency characteristic of an output from the MR head 1 and a frequency characteristic of PR4ML equalization [(1+D) equalization]. Referring to FIG. 6, normalized amplitude of the MR head 1 is plotted vertically, and the frequency is plotted horizontally. FIG. 7 shows a frequency characteristic of a filter for subjecting the output from the MR head 1 to the PR4ML equalization. The amplitude is plotted vertically, and the frequency is plotted horizontally. FIG. 7 shows a frequency characteristic of a filter obtained when a filter cutoff frequency Fc and a filter boost Fb are varied.

In order to make the frequency characteristic of the waveform as shown in FIG. 6 output by the head approach the PR4ML frequency characteristic, an initial equalization should be carried out. For this purpose, the PEF 5 calibrates the filter cut-off frequency Fc and the filter boost Fb in accordance with the characteristic of the MR head 1. The MPU 25 reads set values (digital data) from the memory 26 for each cylinder zone and feeds the values to the DAC 12 and the DAC 13, the set values specifying the filter cut-off frequency Fc and the filter boost Fb to be set for each cylinder zone and for the selected MR head 1. The PEF 5 sets the filter cut-off frequency Fc and the filter boost Fb for each cylinder zone on the basis of the set values provided by the DAC 12 and the DAC 13.

In an automatic calibration of the filter cut-off frequency Fc and the filter boost Fb, a table specifying a relationship as shown in FIG. 8 is stored in the memory 26. FIG. 8 shows a relationship between the normalized linear density K and combinations of the filter cut-off frequency Fc and the filter boost Fb. The normalized linear density K is given by K=W50/T, that is, the ratio between a half-amplitude W50 of an isolated pulse in the output from the MR head 1 and a sampling frequency T. The MPU 25 calibrates the set values of Fc and Fb to be actually fed to the DAC 12 and the DAC 13 in accordance with the variation in the MR head 1, based on the table specifying the relationship between the normalized linear density K and the combinations of Fc and Fb. The MPU 25 thereby prepares a table specifying a relationship shown in FIG. 9 and stores the table in the memory 26. The MPU 25 refers to the table specifying the relationship shown in FIG. 9 and stored in the memory 26 so as to read the set values of the filter cut-off frequency Fc and the filter boost Fb for the selected MR head 1 and feeds the read values to the DAC 11 and DAC 13.

Accordingly, the PEF 5 sets the filter cut-off frequency Fc and the filter boost Fb most suitable for each cylinder zone and the selected MR head 1 based on the set values provided by the DAC 12 and the DAC 13.

As has been described, the PEF 5 effects an initial equalization for making the frequency characteristic of the waveform output by the head approach the PR4ML frequency characteristic. The output of the PEF 5 is fed to the sample-and-hold circuit 6 and converted into sample-and-hold values "1", "0" and "−1". The sample-and-hold values output by the sample-and-hold circuit 6 are fed to the adaptive automatic equalizer circuit 7 and subjected to high-speed fine calibration by the cosine automatic equalizer having three taps or five taps. The PR4ML equalization [(1+D) equalization] is executed so as to obtain an ideal frequency characteristic.

An output of the adaptive automatic equalizer circuit 7 subjected to the PR4ML equalization is fed to the Viterbi detection circuit 8 and subjected to maximum likelihood decoding to be turned into a data sequence that is considered most likely. The output of the adaptive automatic equalizer circuit 7 is also fed to the VFO circuit 16 where recovery of clocks etc. is effected. In a data write operation, the VFO circuit 16 is in synchronism with clocks output by the synthesizer 15. In a data read operation, the VFO circuit 16 is in synchronism with the output of the adaptive automatic equalizer circuit 17. The VFO circuit 16 supplies clocks to the AGC circuit 34, the sample-and-hold circuit 6, the adaptive automatic equalizer circuit 7, the Viterbi detection circuit 8 and the RLL (8/9) decoder circuit 9 so that the operation of these circuits are synchronized.

The Viterbi detection circuit 8 has respective slice levels for the three sample-and-hold values "1", "0" and "−1" and effects level shift with respect to the data sequence. Since the Viterbi detection circuit 8 operates such that it shifts the slice level while referring to preceding and subsequent bit streams, the Viterbi detection circuit 8 is also equipped with an error correction capability. The slice level is set in accordance with the set value provided by the DAC 14. The memory 26 stores a table specifying the set values for setting the slice level most suitable for each cylinder zone and the MR head 1. The MPU 25 reads the set value associated with the selected MR head 1 and the cylinder zone from the memory 26 and feeds the read value to the DAC 14. The Viterbi detection circuit 8 sets the slice level most suitable for the selected MR head 1 and the cylinder zone based on the set value provided by the DAC 14.

Digital data output by the Viterbi detection circuit 8 is decoded by the RLL (8/9) decoder circuit 9. The de-scrambler 10 demodulates pseudo random pattern data from the RLL (8/9) decoder circuit 9 into an original data sequence which is then fed as NRZ data to the host system 30 via a bus 28.

FIGS. 10A–10G are time charts showing how the NRZ data is produced in a read system 32 based on the output from the MR head 1. FIG. 10A shows a waveform of an output from the MR head 1; FIG. 10B shows an output from the PEF 5; FIG. 10C shows a signal relating to the operation on the EVEN circuit of the Viterbi detection circuit 8; FIG. 10D shows a signal relating to the ODD circuit of the Viterbi detection circuit 8; FIG. 10E shows an output of the Viterbi detection circuit 8; FIG. 10F shows an input to the RLL (8/9) decoder circuit 9; and FIG. 10G shows an output (NRZ data) from the RLL (8/9) decoder circuit 9.

The ODD circuit and the EVEN circuit of the Viterbi circuit 8 are provided to be parallel with each other, and signals from these circuits are interleaved. As a result, a high-speed operation is possible even if the operating speed of the circuits are half that of the potential speed. Referring to FIGS. 10C and 10D, a positive slice level +th and a negative slice level −th are set for sample data in the Viterbi detection circuit 8. The slice levels −th and +th are shifted in response to a variation in the level of the data. These slice levels −th and +th are set based on the set values provided by the DAC 14. As shown in FIGS. 10C and 10D, in a normal condition of the magnetic disk drive, the slice levels −th and +th are set to ±50% of the maximum amplitude of the sample data. It is possible to vary the slice levels −th and +th depending on the value of the sample data, so as to set the levels at the most suitable values.

FIG. 11 shows a relationship between set values provided by the DAC 14 and slice levels in the Viterbi detection circuit 8. In the Viterbi algorithm, a data sequence is demodulated while a path is being determined, as indicated by the Trellis diagrams of FIGS. 10C and 10D. FIG. 10E shows an output from the Viterbi detection circuit 8 obtained by synthesizing the data sequence resulting from the interleaving of outputs from the ODD circuit and the EVEN circuit of the Viterbi circuit 8 into an original data sequence. In the examples shown in FIGS. 10A–10G, the data pattern output from the Viterbi detection circuit 8 and fed to the RLL (8/9) decoder circuit 9 is 0B5HEX. The RLL (8/9) decoder circuit 9 converts this data pattern into NRZ data 55HEX using a known 8/9 conversion table (not shown). In FIGS. 10A–10G, the operation of the de-scrambler circuit 10 is omitted from the illustration for the convenience's sake.

A description will now be given of a data write operation.

When a data write operation is performed, NRZ data from the host system 30 is fed to the scrambler circuit 17 via the buss 28 and converted into a pseudo random pattern. The pseudo random pattern data output from the scrambler circuit 17 is encoded by the RLL (8/9) encoder circuit 18. The encoded data is subjected to 1/(1+D) conversion by the precoder circuit 19, where D denotes a delay operator, and is fed to the write precomp. circuit 20. A write precomp. level WCP of the write precomp. circuit 20 is set be equal to a most suitable write precomp. level WCP specified in the register 27. The write precomp. level in the register 27 can be set by the MPU 25 via the serial port 24. In accordance with the operating condition of the magnetic disk drive and the like, the MPU 25 reads a write precomp. level WCP most suitable for the selected (that is, currently used) write head 23, from among the data stored in the memory 26, and sets the read level in the register 27. An output of the write precomp. circuit 20 is fed to the driver 22 via the write FF 21. The write head 23 writes data on the magnetic disk 29 based on an output from the driver 22.

FIG. 12 shows a relationship between write precomp. levels WCP to be set in the write precomp. circuit 20 and associated set values to be specified in the register 27. The memory 26 stores a table specifying the relationship as shown in FIG. 12.

Figure 13A:
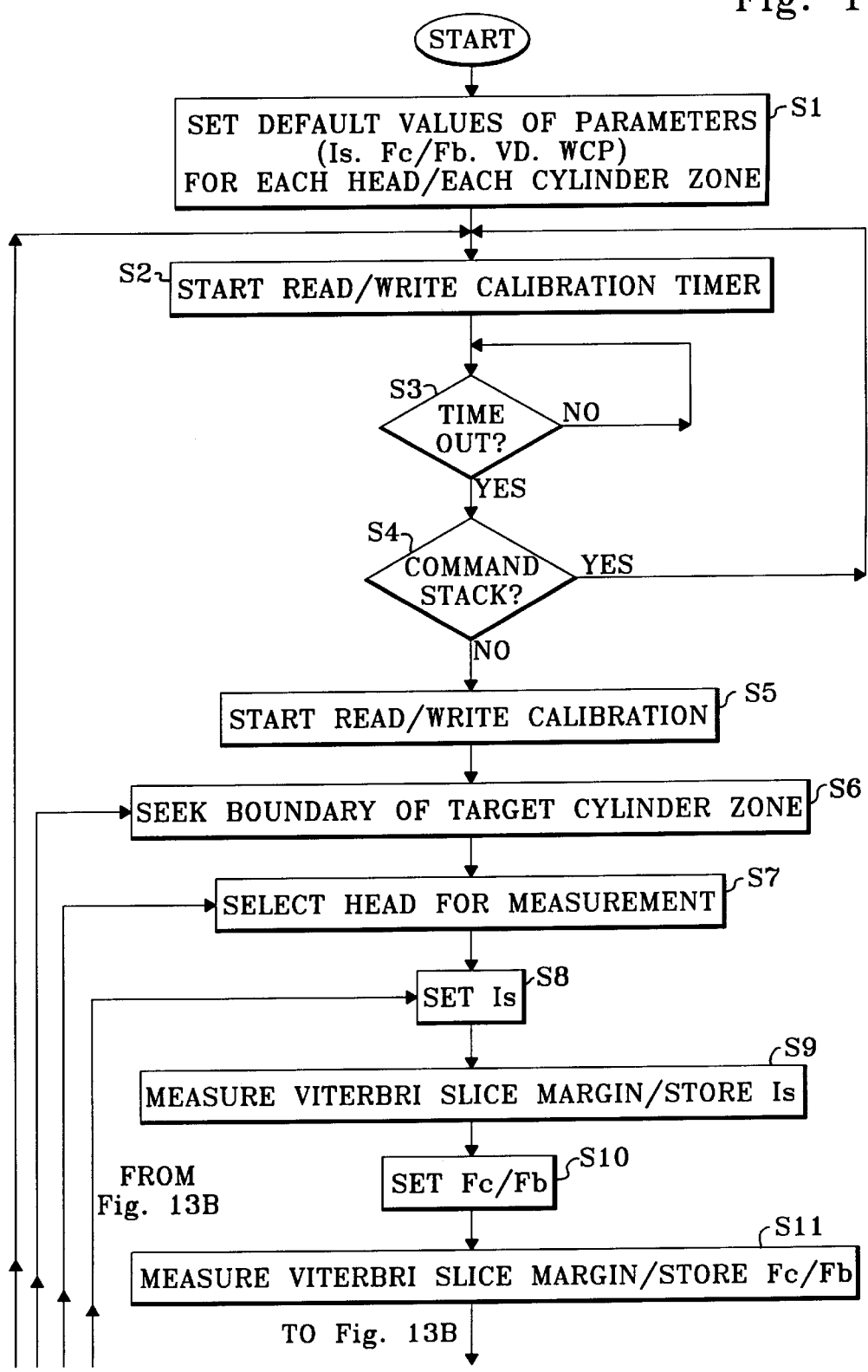
FIG. 13 is a flowchart explaining an embodiment of an MPU shown in FIG. 2.

A description will now be given, with reference to FIG. 13, of an automatic calibration operation carried out in read/write operations. FIG. 13 is a flowchart explaining an embodiment of the operation of the MPU 25 shown in FIG. 2.

When the magnetic disk drive is turned ON, MPU 25 sets defaults values of the sense current Is shown in FIG. 4, the combination of Fc and Fb shown in FIG. 9, the slice level shown in FIG. 11 and the write precomp. level WCP shown in FIG. 12, the setting being done for each MR head 1, write head 23 and cylinder zone. In S2, the MPU 25 starts its internal timer as a read/write calibration timer set to a predetermined time. In S3, a determination is made as to whether or not the time set in the read/write calibration timer has expired. If an affirmative answer is yielded in S3, the control is turned over to S4 where a determination is made as to whether or not there is a stack of commands in the interface of the magnetic disk drive. If there is a stack of commands (or if a command is being executed), that is, if an affirmative answer is yielded in S4, no calibration is carried out and the control is returned to S2.

If a negative answer is yielded in S4, the control is turned over to S5 where calibration is started. A cylinder is divided into a total of n areas so that the calibration is conducted in the first cylinder zone. Hence, in S6, a seek operation targeted at a boundary of the first cylinder is executed. In S7, one of the MR head 1 from among a total of n MR heads 1 is selected.

In S8, the table specifying the relationship shown in FIG. 3 is referred to so as to set the sense current Is. In S9, the Viterbi slice margin is measured for different levels of the sense current Is, the slice level of the Viterbi detection circuit 8 being used as a parameter. The sense current Is providing a maximum Viterbi slice margin determined as a result of the measurement of the Viterbi slice margin is stored in the table specifying the relationship shown in FIG. 4 so that the table is updated.

In S10, the table specifying the relationship shown in FIG. 8 is referred to so as to set the combination of the filter cut-off frequency Fc and the filter boost Fb for a normalized linear density K. In S11, the Viterbi slice margin is measured for different combinations of Fc and Fb, the slice level of the Viterbi detection circuit 8 being used as a parameter. The combination of Fc and Fb providing a maximum Viterbi slice margin determined as a result of the measurement of the Viterbi slice margin is stored in the table specifying the relationship shown in FIG. 9 so that the table is updated.

In S12, the table specifying the relationship shown in FIG. 12 is referred to so as to set the write precomp. level WCP. In S13, the Viterbi slice margin is measured for different write precomp. levels WCP, the slice level of the Viterbi detection circuit 8 being used as a parameter. The write precomp. level WCP providing a maximum Viterbi slice margin as a result of the measurement of the Viterbi slice margin is stored in the table specifying the relationship shown in FIG. 12 so that the table is updated.

In S14, a central value VD of the Viterbi slice margin is stored in the table specifying the relationship shown in FIG. 11.

In S15, a determination is made as to whether or not the measurement is conducted a predetermined number of times (m). If a negative answer is yielded in S15, the control is returned to S8. If an affirmative answer is yielded in S15, the control is turned over to S16 where a determination is made as to whether or not a total of n heads have been subjected to measurement, that is whether or not a total of n MR heads 1 have been selected. If a negative answer is yielded in S16, the control is returned to S7. If an affirmative answer is yielded in S16, the control is turned over to S17 where a determination is made as to whether or not a total of n cylinder heads have been subjected to measurement. If a negative answer is yielded in S17, the control is returned to S6. If an affirmative answer is yielded in S17, the control is returned to S2.

After the processes shown in FIG. 13 are executed a predetermined number of times (m), the parameters Is, Fc, Fb and WCP providing a maximum Viterbi slice margin are selected and stored in the memory 26 so as to update the content of the memory 26. The central value of the Viterbi slice margin is stored in the memory 26 so as to update the content of the memory 26. The processes are conducted for all designated heads and designated cylinder zones. This embodiment is configured such that the processes shown in FIG. 13 are carried out after the magnetic disk drive is turned ON and carried out at predetermined intervals according to the calibration timer.

To reiterate, it is possible to perform at regular intervals calibration for automatically calibrating parameters like the sense current Is, the filter cut-off frequency Fc, the filter boost Fb, the slice level of the Viterbi detection circuit 8, the write precomp. level WCP in accordance with the operating condition of the magnetic disk drive. Further, even when there is a variation in the operating condition of the magnetic disk drive, for example, a variation in the temperature or the voltage, the parameters are automatically calibrated in accordance with the variation. Therefore, it is always possible to perform read/write operations using the most suitable parameters.

Figure 14:
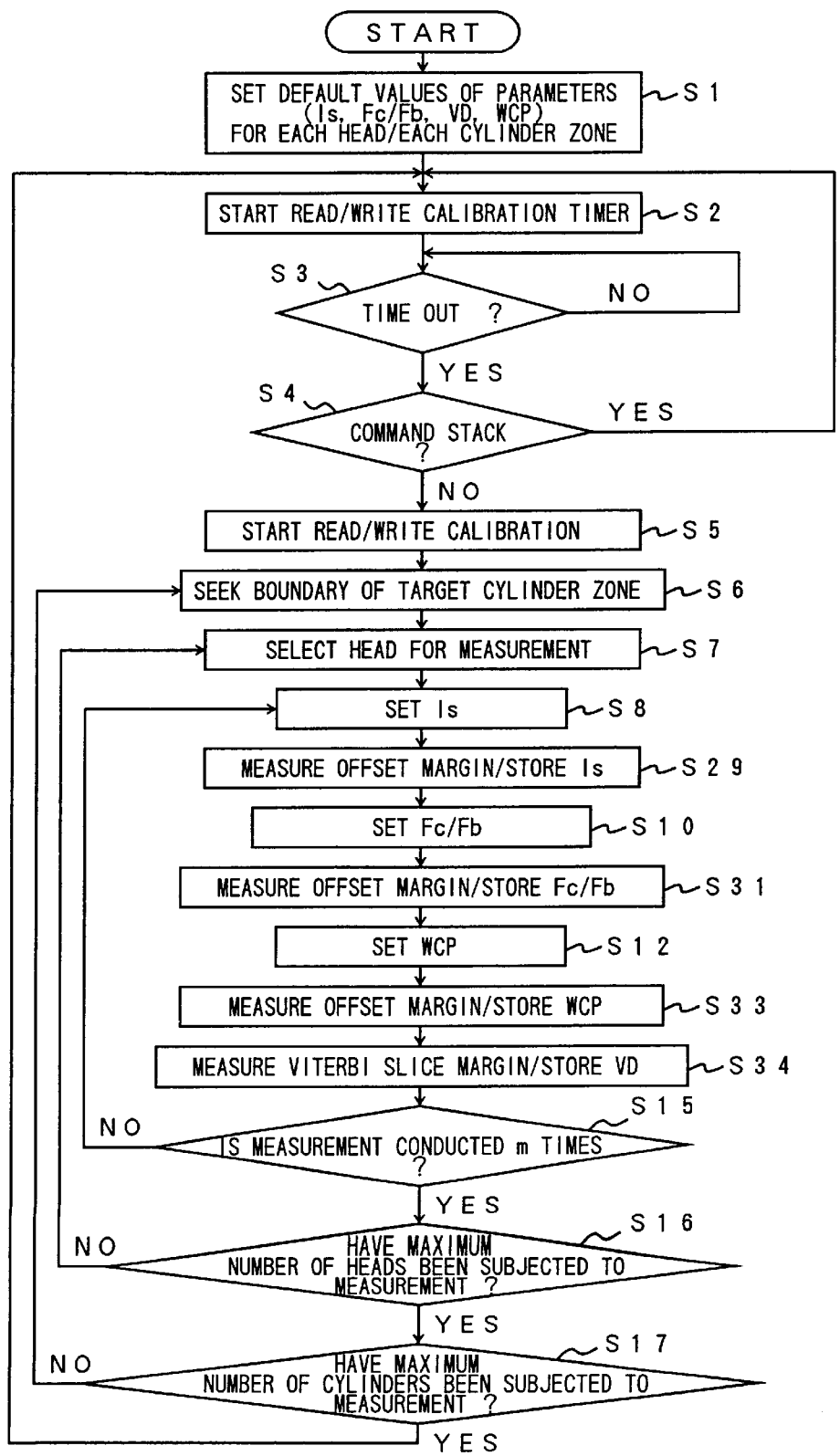
FIG. 14 is a flowchart explaining another embodiment of the MPU shown in FIG. 2.

FIG. 14 is a flowchart showing another embodiment of the operation of the MPU 25 shown in FIG. 2. In FIG. 14, those steps that are the same as the steps of FIG. 13 are designated by the same reference numerals, and the description thereof is omitted. While the Viterbi slice margin is used as a parameter in the measurement in the processes shown in FIG. 13, the track offset margin is used as a parameter in the measurement in the processes shown in FIG. 14.

Referring to FIG. 14, in step S8, the MPU 25 refers to the table specifying the relationship shown in FIG. 3 so as to set the sense current Is. In S29, the track offset margin is measured for different levels of the sense current Is, the track offset being used as a parameter. The sense current Is providing a maximum track offset margin as a result of the measurement of the track offset margin is stored in the table specifying the relationship shown in FIG. 4 so that the table is updated.

In S10, the table specifying the relationship shown in FIG. 8 is referred to so as to set the combination of the filter cut-off frequency Fc and the filter boost Fb for a normalized linear density K. In S31, the track offset margin is measured for different combinations of Fc and Fb, the track offset being used as a parameter. The combination of Fb and Fc providing a maximum track offset margin as a result of the measurement of the track offset margin is stored in the table specifying the relationship shown in FIG. 9 so that the table is updated.

In S12, the table specifying the relationship shown in FIG. 12 is referred to so as to set the write precomp. level WCP. In S33, the track offset margin is measured for different write precomp. levels WCP, the track offset being used as a parameter. The write precomp. level WCP providing a maximum track offset margin as a result of the measurement of the track offset margin is stored in the table specifying the relationship shown in FIG. 12 so that the table is updated.

In S34, the Viterbi slice margin is measured, and the central value VD of the Viterbi slice margin is stored in the table specifying the relationship shown in FIG. 11 so that the table is updated. The other processes are substantially the same as the processes shown in FIG. 13.

In the first embodiment shown in FIG. 2, PR4ML equalization is executed according to an analog method. However, the present invention can be equally applied to a case where the PR4ML equalization is executed according to a digital method. If the analog filter PEF5 is replaced by a digital circuit, an analog-digital converter (ADC) effects the initial PR4ML equalization. Using this construction, the same effect as that of the first embodiment described above can be achieved.

Figure 1:
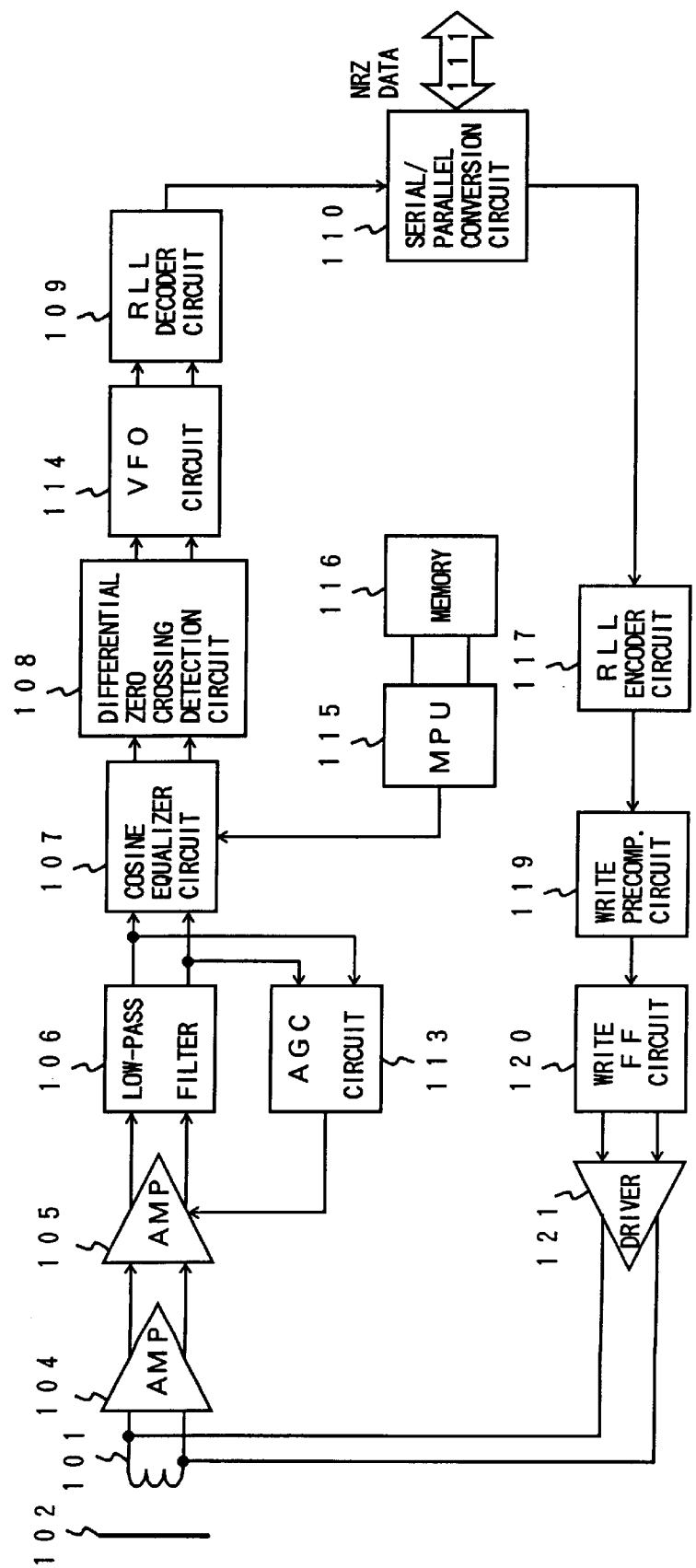
FIG. 1 is a block diagram showing an example of a conventional magnetic disk drive using a peak detection method.

FIG. 15 is a block diagram showing a second embodiment of the storage apparatus according to the present invention. In the second embodiment of the storage apparatus, a second embodiment of the automatic calibration method according to the present invention and a second embodiment of the read apparatus according to the present invention are employed. Also, in the second embodiment of the storage apparatus, the present invention is applied to a magnetic disk drive. In the second embodiment of the storage apparatus, the PR4ML equalization is executed according to a digital method. In FIG. 15, those components that are substantially the same as the components of FIGS. 1 and 2 are designated by the same reference numerals, and the description thereof is omitted.

Referring to FIG. 15, an automatic equalizer circuit 41 comprises a PR4ML (1+D) equalizer and an ADC. The operation of the automatic equalizer circuit 41 corresponds to the operation of the sample-and-hold circuit 6 and the adaptive automatic equalizer circuit 7 shown in FIG. 2. The operation of a Viterbi detection circuit 42 and a de-scrambler circuit 43 corresponds to the operation of the Viterbi detection circuit 8 and the de-scrambler circuit 10 shown in FIG. 2, respectively. The operation of a scrambler circuit 46 and a precoder circuit 47 corresponds to the operation of the scrambler circuit 17 and the precoder circuit 19 shown in FIG. 2, respectively. The operation of a VFO circuit 114 and an AGC circuit 113 corresponds to the operation of the VFO circuit 16 and the AGC circuit 34 shown in FIG. 2, respectively.

As in the case of the first embodiment described above, it is necessary to perform an initial equalization in order to bring the frequency characteristic of the waveform output by the head close to the PR4ML equalization frequency characteristic. Therefore, the low-pass filter 106 has its filter cutoff frequency Fc and filter boost Fb calibrated in accordance with the characteristic of the MR head 1. An MPU 215 reads set values from a memory 216 for each cylinder zone and feeds the values to a parameter setting circuit 44, the set values specifying the filter cut-off frequency Fc and the filter boost Fb to be set for each cylinder zone and for the selected MR head 1. The low-pass filter 106 sets the filter cut-off frequency Fc and the filter boost Fb for each cylinder zone on the basis of the set values provided by the parameter setting circuit 44.

While a parameter setting circuit for providing the set value of the write precomp. level WCP to the write precomp. circuit 119 and a parameter setting circuit for providing the set value of the slice level to the Viterbi detection circuit 42 are omitted in FIG. 15, these parameters, i.e. the write precomp. level WCP and the slice level can also be set similarly to the filter cut-off frequency Fc and the filter boost Fb set by the low-pass filter 106.

In the automatic calibration in read/write operations, the MPU 215 executes processes similar to the processes shown in FIGS. 13 and 14. Therefore, the description of the operation of the MPU 215 is omitted.

While the present invention is applied to the PR4ML method in the first and second embodiments, the principle of the present invention can also be applied to automatic calibration, in accordance with the operating condition, of various parameters of a read apparatus or a magnetic disk drive employing the conventional peak detection method. In this case, the equalization level of the cosine equalizer or the shift level of the data window width may be used as parameters for automatic calibration.

It is of course possible to apply the first and second embodiments described above to a magnetic disk drive in which a constant density recording method called a zone bit recording method is used. In this case, a cylinder may be provided specifically for the purpose of automatic calibration in a boundary of a write zone divided in radial directions of the magnetic disk.

Figure 16:
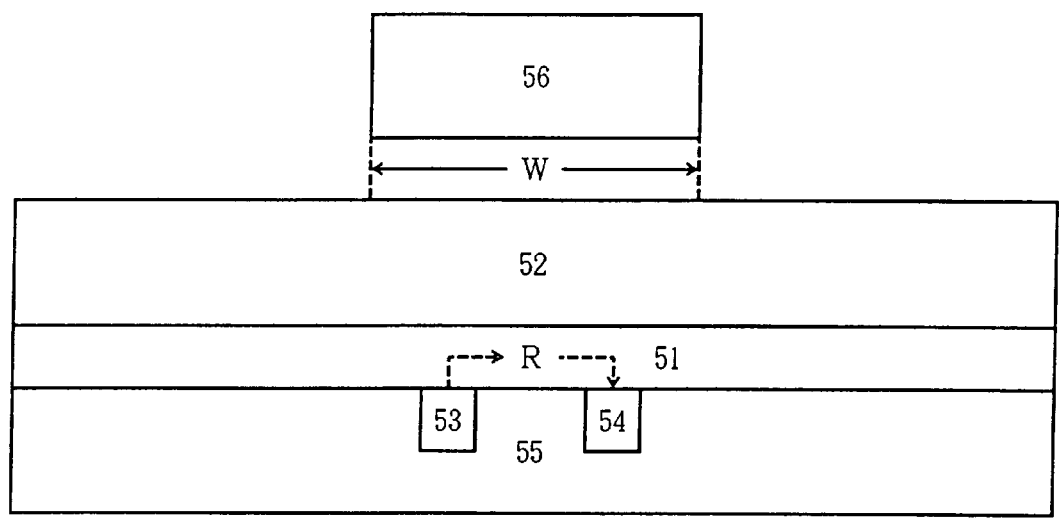
FIG. 16 is a sectional view of a composite head.

There is a proposal for a composite head in which the MR head and the write head used in the first and second embodiments are integrated. FIG. 16 is a sectional view of such a composite head.

Referring to FIG. 16, the composite head generally comprises an MR element 51, magnetic poles 52 and 56, electrodes 53 and 54 and a substrate 55. In a data write operation, data is written to a magnetic disk (not shown) in a write gap having a width W and provided between the magnetic poles 52 and 56. In a data read operation, a magnetic flux derived from the magnetic disk is detected by causing a current to flow in the MR element 51 as indicated by a broken line in FIG. 16 via the electrodes 53 and 54. A restored waveform is output by converting a variation in magnetic field intensity into a variation in resistivity. Accordingly, a width R of a read gap in a data read operation is identical to a distance between the electrodes 53 and 54. A known rotary actuator may be used as a means for translating the composite head between tracks on the magnetic disk. In this case, the composite head moves in radial directions of the magnetic disk such that it describes an arc in radial directions about a point outside the magnetic disk.

FIGS. 17A–17D show how a write gap and a read gap relate to a track when the composite head is located at an innermost cylinder of the magnetic disk and an outer most cylinder thereof. In FIGS. 17A–17D, W indicates a width of a write gap, R indicates a width of a read gap, and T indicates a track.

Figure 17B:
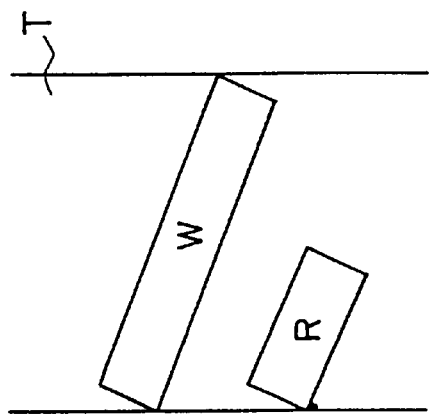
FIGS. 17A–17D show how a write gap and a read gap relate to a track when the composite head is located in an innermost cylinder of the magnetic disk and an outer most cylinder thereof.
Figure 17D:
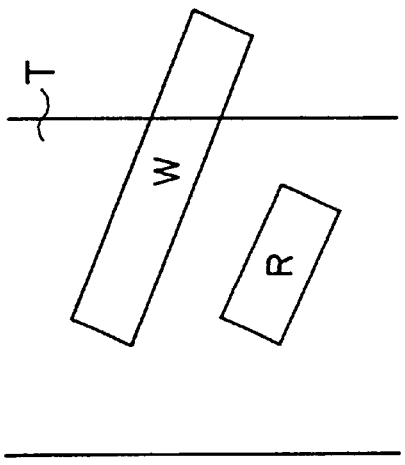
Figure 17A:
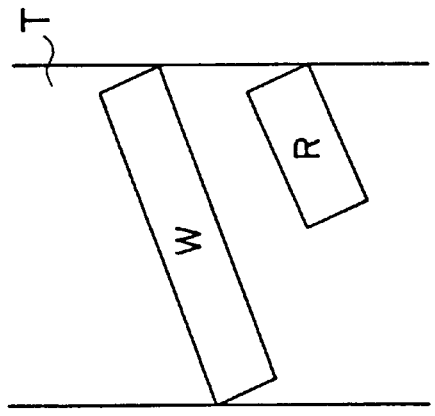

FIGS. 17A and 17B show how the write gap having the width W and the read gap having the width R relate to the track T when a write operation for updating data is executed, FIG. 17A showing the composite head located in the innermost cylinder, and FIG. 17B showing it located in the outermost cylinder. Before the update write operation is carried out, an address part (hereinafter, referred to as an ID part) is read so as to confirm that the composite head is located at a target block.

Figure 17C:
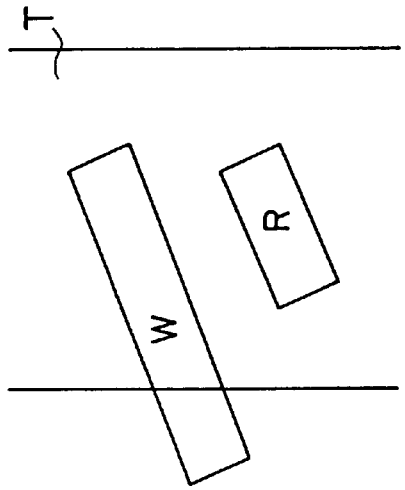

FIGS. 17C and 17D show how the write gap having the width W and the read gap having the width R relate to the track T when a data read operation is executed, FIG. 17C showing the composite head located in the innermost cylinder, and FIG. 17D showing it located in the outermost cylinder.

It will be apparent by comparing FIGS. 17A–17D with each other, that the relative position of the read gap having the width R with respect to the track T when reading from the ID part in the update write operation differs from the corresponding position of the read gap when reading from the ID part in the data read operation.

Figure 18:
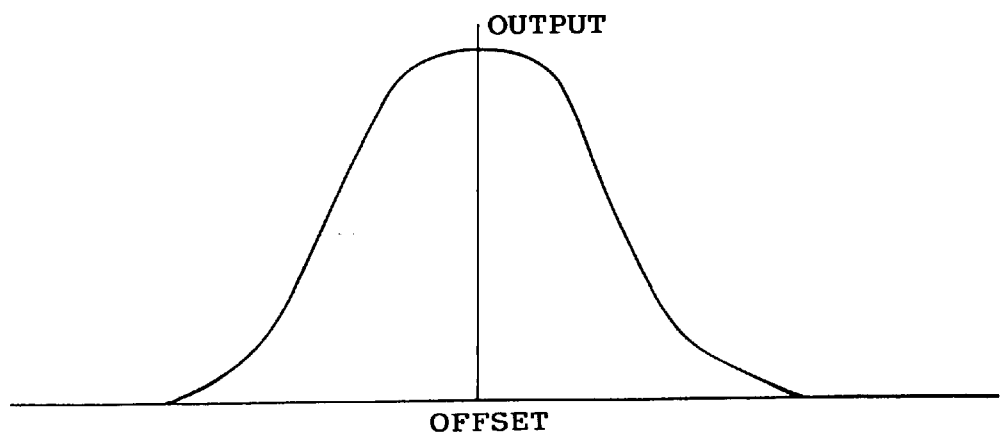
FIG. 18 shows an output characteristic of the MR head.

FIG. 18 shows an output characteristic of the MR head. Outputs are plotted vertically and offsets of the read gap having the width R from the center of the track T are plotted horizontally. Generally, as shown in FIG. 18, the output of the MR head exhibits a drop as the read gap is displaced from the center of the track T in a radial direction of the magnetic disk. This means that an area of the MR head sensitive to the magnetic flux is not limited to an area between the electrodes 53 and 54 shown in FIG. 16, and that the MR element 51 extending away from the electrodes 53 and 54 is also susceptible to the magnetic flux.

Generally, the characteristic of the demodulating system is set to be at its best when the head reads from a data part. Thus, when the head reads from the ID part in the update write operation, the signal-to-noise (S/N) ratio is generally worse than when the head reads from the data part. Because of this S/N ratio deterioration occurring when the head reads from the ID part, the read error rate for the ID part increases so that the read error rate in the magnetic disk drive as a whole increases. A description will now be given of an embodiment capable of suppressing an increase in the read error rate due to a deterioration in the S/N ratio occurring when the head reads from the ID part.

Figure 19:
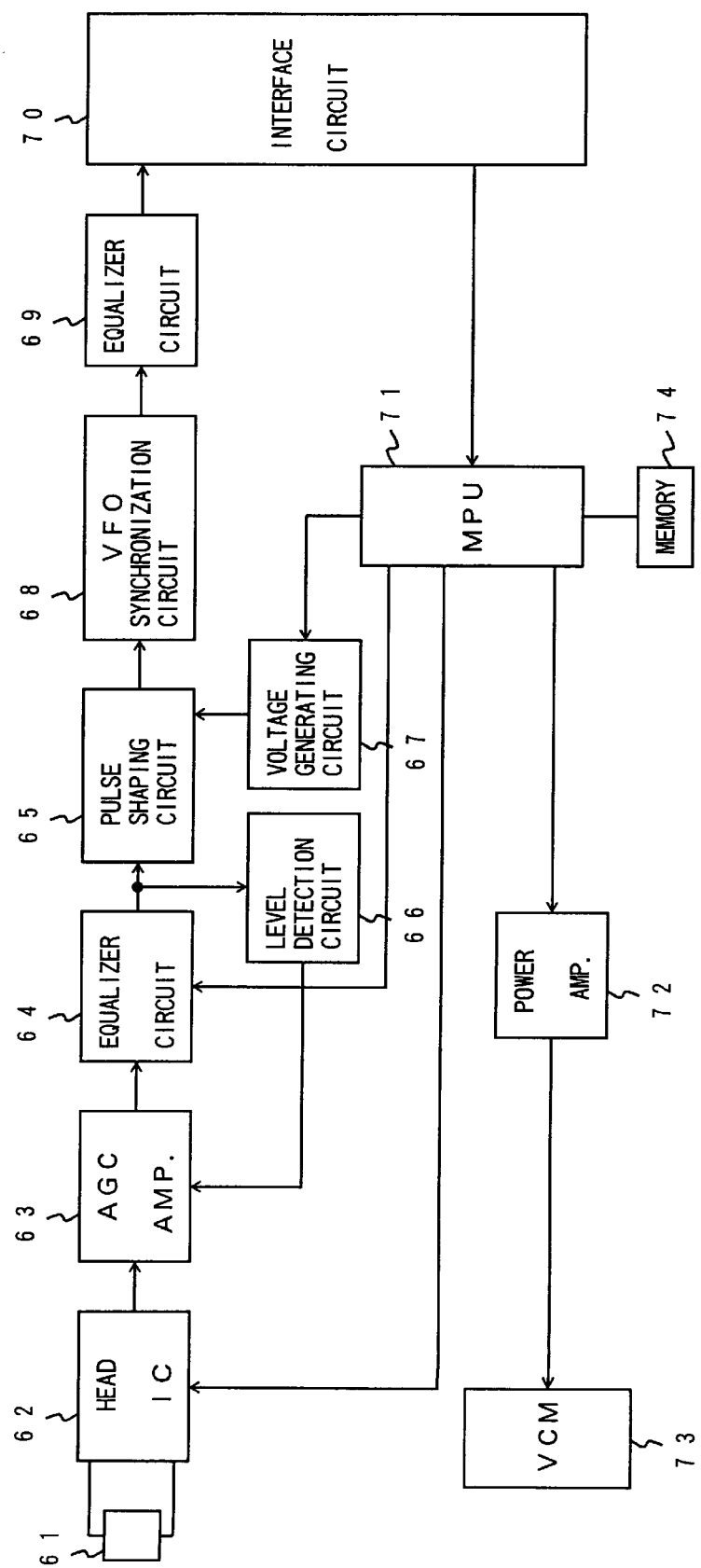
FIG. 19 is a block diagram showing a third embodiment of a storage apparatus according to the present invention.

FIG. 19 is a block diagram showing a third embodiment of a storage apparatus according to the present invention. In the third embodiment of the storage apparatus, a third embodiment of the automatic calibration method according to the present invention and a third embodiment of the read apparatus according to the present invention are employed. In the third embodiment of the storage apparatus, the present invention is also applied to the magnetic disk drive.

Referring to FIG. 19, the magnetic disk drive generally comprises an MR head 61, a head integrated circuit (IC) 62 having a function of setting a current supplied to the MR head 61, an AGC amplifier 63, an equalizer circuit 64, a pulse shaping circuit 65, a level detection circuit 66, a voltage generation circuit 67 for setting a slice level of the pulse shaping circuit 65, a VFO synchronization circuit 68, a demodulating circuit 69, an interface circuit 70 for exchanging commands and data with an upper system (not shown), a voice coil motor (VCM) 73 for translating the MR head 61, a power amplifier 72 for driving the VCM 73, an MPU 71 for controlling the VCM 73, and a memory 74 for storing programs and data. The MR head 61 and a write head (not shown) constitute a composite head. As in the case of the first and second embodiments, a plurality of magnetic disks are actually provided, and, accordingly, a plurality of composite heads are provided.

Each of the individual circuits shown in FIG. 19 is known so that illustration and description of its construction is omitted. For example, the head IC 62 can be realized by a semiconductor chip 32R1510R from SSI Inc. The part of the magnetic disk drive including the AGC amplifier 63, the equalizer circuit 64, the pulse shaping circuit 65, the level detection circuit 66 and the voltage generation circuit 67 is provided by a semiconductor chip 32P3011 from SSI Inc. The part including the VFO synchronization circuit 68 and the demodulating circuit 69 is provided by a semiconductor chip 32D5391 from SSI Inc. The interface circuit 70 is provided by a semiconductor chip TEC336 from Q-LOGIC Inc. The MPU 71 is provided, for example, by a semiconductor chip P8031AH from TI Inc. The power amplifier 72 is provided by a semiconductor chip HA13524 from Hitachi Inc.

When a data write command is fed from the host system to the MPU 71 via the interface circuit 70, the MPU 71 controls the VCM 73 via the power amplifier 72 so that the MR head 61 is translated to a target track on the magnetic disk (not shown). Thereupon, the MR head 61 reads from the IR part for confirming that the target block has been reached. Since the composite head is positioned so that the write head is not located outside the track, the read gap of the MR head 61 takes either a position as shown in FIG. 17A or a position shown in FIG. 17B, depending on whether the composite head is positioned in the innermost cylinder or the outermost cylinder, respectively. While the S/N ratio of a signal read by the MR head 61 from the ID part exhibits a deterioration otherwise, deterioration in the S/N ratio is restricted to a minimum level in this embodiment by causing the MPU 71 to set the parameter of the demodulating system anew when the head reads from the ID part. In this way, increase in the read error rate for the ID part is suppressed.

The parameters of the demodulating system that are set anew when the head reads from the ID part are predetermined parameters most suitable for reading from the ID part and stored in the memory 74. The parameters include a current supplied by the head IC 62 to the MR head 61, the filter cut-off frequency and the filter boost of the equalizer circuit 64, and the slice level of the pulse shaping circuit 65.

The parameters may be set each time the head reads from the ID part. Alternatively, a determination may be made as to whether or not it is necessary to set the parameters when the MR head 61 reads from the ID part, based on whether the MR head 61 is positioned in the innermost cylinder or in the outermost cylinder. The parameters may be re-set when the head reads from the ID part so as to adapt for the cylinder at which the MR head 61 is positioned.

Alternatively, the parameters may be reset likewise when the data part is read by offsetting the head in the radial direction of the magnetic disk.

The setting of the parameters is carried out in a manner described in the first and second embodiments, and a detailed description thereof is omitted. A description will now be given of how the parameters are measured and stored.

FIG. 20 is a flowchart explaining an embodiment of the operation of the MPU 71 shown in FIG. 19. Referring to FIG. 20, in step S41, the parameters for a data part read operation are read from the memory 74 and set as default values in the head IC 62, the equalizer 64 and the voltage generation circuit 67, for all the MR heads 61 and the cylinders. In S42, a current fed to the MR head 61 selected for the target cylinder is made to vary so that a current value that enables a reading operation and provides a broadest range in which the slice level of the shaping circuit 65 is set is selected. In S43, the filter cut-off frequency of the equalizer circuit 64 is made to vary so that a filter cut-off frequency value that enables a read operation and provides a broadest slice level setting range of the pulse shaping circuit 65 is selected. In S44, the filter boost level of the equalizer circuit 64 is made to vary so that a filter boost level that enables a read operation and provides a broadest slice level setting range of the pulse shaping circuit 65 is selected. In S45, the slice level is set to a central value of the slice level setting range obtained through steps S43 and S44.

In Step 46, a determination is made as to whether or not the selection of the parameters is completed for all composite heads. If a negative answer is yielded in S 46, the composite head selected in S47 is changed to a different composite head, and the control is returned to S42. If an affirmative answer is yielded in S46, the control is turned over to S48 where a determination is made as to whether or not the parameter measurement process is completed for all cylinders. If a negative answer is yielded in S48, the control is turned over to S49 where the target cylinder is switched to a different cylinder, and the control is returned to S42. If an affirmative answer is yielded in S48, the control is turned over to S50 where the measured parameters are stored in the memory 74, whereupon the processes are terminated.

The parameter measurement process shown in FIG. 20 may be executed when the magnetic disk drive is turned ON or at predetermined intervals.

The present invention is not limited to the above described embodiments, and variations and modifications may be made without departing from the scope of the present invention.

What is claimed is,:

1. An automatic calibration method for calibrating a read system in which data read by a head from a recording medium is demodulated, said automatic calibration method comprising the steps of:

a) storing first and second sets of parameters for a plurality of operating conditions, the first set of parameters specifying a bias current fed to said head, and the second set of parameters being used by the read system to demodulate data; and b) automatically calibrating said first and second sets of parameters in this order to preset values for a selected operating condition including at least at one of initial power-up of the read system and at predetermined time intervals so that the bias current is preset to a value for the selected operating condition and the second set of parameters is preset to values suitable for the preset value of the bias current.

2. The automatic calibration method as claimed in claim 1, wherein said step b) is executed at predetermined intervals.

3. The automatic calibration method is claimed in claim 1, wherein said read system comprises a PR4 equalizer circuit for demodulating data using a PR4ML method and a maximum likelihood detection circuit, and step a) comprises storing, as said second set of parameters, at least one of a filter cut-off frequency of said PR4 equalizer circuit, a filter boost level of said PR4 equalizer circuit and a slice level of said maximum likelihood detection circuit, for a plurality of operating conditions.

4. The automatic calibration method as claimed in claim 1, wherein said step a) and step b) are executed for each of a plurality of heads.

5. The automatic calibration method as claimed in claim 1, wherein step a) comprises measuring and storing optimal values of said first and second sets of parameters for a plurality of operating conditions.

6. The automatic calibration method as claimed in claim 1, wherein step b) is executed when information is read from an ID part on said recording medium.

7. The automatic calibration method as claimed in claim 1, wherein said operating condition is at least one of a temperature, a voltage used to demodulate data in said read system and a position of said head with respect to a track on said recording medium.

8. A read apparatus in which data read by a head from a recording medium is demodulated, said read apparatus comprising:

a read system for demodulating data, said system being provided with an equalizer circuit for demodulating data and a maximum likelihood detection circuit;

storing means storing first and second sets of parameters for a plurality of operating conditions, the first set of parameters specifying a bias current fed to said head, and the second set of parameters being used by said read system to demodulate data; and control means for reading parameters from said storing means under a selected operating condition and automatically calibrating said first and second sets of parameters in this order to preset values for said selected operating condition at least at one of initial power-up of the read system and at predetermined time intervals so that the bias current is preset to a value for the selected operating condition and the second set of parameters is preset to values suitable for the preset value of the bias current.

9. The read apparatus as claimed in claim 8, wherein said control means executes an operation of automatically calibrating at least one of said first and second parameters at predetermined intervals.

10. The read apparatus as claimed in claim 8, wherein said storing means stores, as said second set of parameters, at least one of a filter cut-off frequency of said equalizer circuit, a filter boost level of said equalizer circuit and a slice level of said maximum likelihood detection circuit, for a plurality of operating conditions.

11. The read apparatus as claimed in claim 8, wherein said storing means stores parameters for each of a plurality of heads, and said control means executes a calibration for each of said plurality of heads.

12. The read apparatus as claimed in claim 8, further comprising means for measuring and storing optimal values of said first and second sets of parameters for a plurality of operating conditions.

13. The read apparatus as claimed in claim 8, wherein said control means calibrates when information is read from an ID part on said recording medium.

14. The read apparatus as claimed in claim 8, wherein said operating condition is at least one of a temperature, a voltage used to demodulate and a position of said head with respect to a track on said recording medium.

15. A storage apparatus comprising:

a head for reading data from a disk;

a read system provided with an equalizer circuit for demodulating data read by said head and a maximum likelihood detection circuit;

storing means storing first and second sets of parameters for a plurality of operating conditions, the first set of parameters specifying a bias current fed to said head, and the second set of parameters being used by said read system to demodulate data; and control means for reading parameters from said storing means under a selected operating condition and automatically calibrating said first and second sets of parameters in this order to preset values for said selected operating condition at least at one of initial power-up of the read system and at predetermined time intervals so that the bias current is preset to a value for the selected operating condition and the second set of parameters is preset to values suitable for the preset value of the bias current.

16. The storage apparatus as claimed in claim 15, wherein said control means executes an operation of automatically calibrating at least one of said first and second parameters at predetermined intervals.

17. The storage apparatus as claimed in claim 15, wherein said storing means stores, as said second set of parameters, at least one of a filter cut-off frequency in said equalizer circuit, a filter boost level of said equalizer circuit and a slice level of said maximum likelihood detection circuit, for a plurality of operating conditions.

18. The storage apparatus as claimed in claim 15, wherein said storing means stores parameters for one of each of a plurality of heads and for each of a plurality of cylinders, and said control means calibrates for said one of each of said plurality of heads and for each of said plurality of cylinders.

19. The storage apparatus as claimed in claim 15, further comprising means for measuring and storing optimal values of said first and second sets of parameters for a plurality of operating conditions.

20. The storage apparatus as claimed in claim 15, wherein said control means calibrates when information is read from an ID part on said recording medium.

21. The storage apparatus as claimed in claim 15, wherein said operating condition is at least one of a temperature, a voltage used to demodulate data and a position of said head with respect to a track on said recording medium.

22. The storage apparatus as claimed in claim 15, wherein data is written on said disk with a regular density, and wherein said disk further comprises a dedicated cylinder used for automatic calibration of at least one of said first and second sets of parameters at a boundary of a recording zone divided in radial directions of said disk.

23. The storage apparatus as claimed in claim 15, further comprising:

a write system including a write precompensation circuit for subjecting data to be written to said disk to write precompensation, and modulating the data to be written to said disk; and a write head writing modulated data to said disk; wherein said storing means stores, as parameters, write precompensation levels of said write precompensation circuit for a plurality of operating conditions; and said control means reads parameters under an operating condition from said storing means and automatically calibrates a write precompensation level of said write precompensation circuit to a stored level for said operating condition.

* * * * *